United States Patent
Yamada et al.

(10) Patent No.: US 10,509,251 B2
(45) Date of Patent: Dec. 17, 2019

(54) POLYMERIZABLE COMPOSITION, WAVELENGTH CONVERSION MEMBER, BACKLIGHT UNIT, AND LIQUID CRYSTAL DISPLAY DEVICE

(71) Applicant: FUJIFILM Corporation, Tokyo (JP)

(72) Inventors: Naoyoshi Yamada, Kanagawa (JP); Natsuru Chikushi, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 1 day.

(21) Appl. No.: 15/660,366

(22) Filed: Jul. 26, 2017

(65) Prior Publication Data

US 2017/0322436 A1    Nov. 9, 2017

Related U.S. Application Data

(63) Continuation of application No. PCT/JP2016/000610, filed on Feb. 5, 2016.

(30) Foreign Application Priority Data

Feb. 6, 2015    (JP) .................................. 2015-021921

(51) Int. Cl.
*G02F 1/1334* (2006.01)
*F21V 9/30* (2018.01)
(Continued)

(52) U.S. Cl.
CPC ............ *G02F 1/1334* (2013.01); *B32B 27/20* (2013.01); *C08F 2/44* (2013.01); *C08F 2/48* (2013.01);
(Continued)

(58) Field of Classification Search
CPC .. G02F 1/1334; G02F 1/1335; G02F 2202/36; F21V 9/30; B32B 27/20;
(Continued)

(56) References Cited

U.S. PATENT DOCUMENTS

| | | | |
|---|---|---|---|
| 8,252,416 B2 | 8/2012 | Jun et al. | |
| 2008/0085985 A1* | 4/2008 | Nakamura | ............... C08L 63/00 528/25 |

(Continued)

FOREIGN PATENT DOCUMENTS

| | | |
|---|---|---|
| CN | 101442097 A | 5/2009 |
| CN | 103955093 A | 7/2014 |

(Continued)

OTHER PUBLICATIONS

International Search Report issued in connection with International Patent Application No. PCT/JP2016/000610 dated Apr. 19, 2016.
(Continued)

*Primary Examiner* — Ruiyun Zhang
(74) *Attorney, Agent, or Firm* — Edwards Neils LLC; Jean C. Edwards, Esq.

(57) ABSTRACT

A polymerizable composition provides a high brightness and suppressed decrease in brightness in an outer peripheral region when used in a wavelength conversion member, a wavelength conversion member, a backlight unit, and a liquid crystal display device. The polymerizable composition includes quantum dots having surfaces coordinated with a ligand, a polymerizable compound, and a dispersant, in which the ligand is a molecule that includes a saturated hydrocarbon chain having 6 or more carbon atoms and a coordinating group, a LogP value of the polymerizable compound is 3.0 or lower, the dispersant has a nonpolar and a polar portion in a molecule, and the nonpolar portion is at least one selected from the group consisting of a saturated hydrocarbon chain having 6 or more carbon atoms, an aromatic ring, and a saturated aliphatic ring. The wavelength conversion member, the backlight unit, and the liquid crystal display device include the polymerizable composition.

14 Claims, 3 Drawing Sheets

(51) Int. Cl.
*C08F 2/44* (2006.01)
*B32B 27/20* (2006.01)
*C09K 19/38* (2006.01)
*G02F 1/1335* (2006.01)
*C09K 19/02* (2006.01)
*C08F 2/48* (2006.01)
*C08K 3/32* (2006.01)
*C08K 3/013* (2018.01)

(52) U.S. Cl.
CPC ...... *C09K 19/0208* (2013.01); *C09K 19/3852* (2013.01); *F21V 9/30* (2018.02); *G02F 1/1335* (2013.01); *B32B 2307/422* (2013.01); *B32B 2457/202* (2013.01); *C08K 3/013* (2018.01); *C08K 3/32* (2013.01); *C09K 2219/00* (2013.01); *G02F 2001/133614* (2013.01); *G02F 2201/50* (2013.01); *G02F 2202/023* (2013.01); *G02F 2202/36* (2013.01); *Y10T 428/10* (2015.01); *Y10T 428/1036* (2015.01)

(58) Field of Classification Search
CPC ........ B32B 2307/422; B32B 2457/202; C09K 11/703; C09K 13/02; C09K 2201/011; Y10S 977/834; B82Y 20/00; Y10T 428/10; Y10T 428/1036; Y10T 428/105
USPC ............... 428/1.1, 1.3, 1.33; 252/500, 518.1, 252/519.34, 519.33, 519.4, 519.5; 385/130; 362/606
See application file for complete search history.

(56) References Cited

U.S. PATENT DOCUMENTS

| | | | |
|---|---|---|---|
| 2008/0290936 | A1 | 11/2008 | Jun et al. |
| 2010/0304149 | A1* | 12/2010 | Loccufier ............... C08F 2/48 428/412 |
| 2012/0113672 | A1* | 5/2012 | Dubrow ............... B82Y 20/00 362/602 |
| 2012/0267616 | A1* | 10/2012 | Jang ............... B82Y 20/00 257/40 |

FOREIGN PATENT DOCUMENTS

| | | |
|---|---|---|
| EP | 2826836 A1 | 1/2015 |
| JP | 2008-285753 A | 11/2008 |
| JP | 2012-525467 A | 10/2012 |
| JP | 2013-544018 A | 12/2013 |
| WO | 2010/126606 A1 | 11/2010 |
| WO | 2012/064562 A2 | 5/2012 |

OTHER PUBLICATIONS

Written Opinion issued in connection with International Patent Application No. PCT/JP2016/000610 dated Apr. 19, 2016.

Office Action issued by the State Intellectual Property Office dated Apr. 17, 2018, in connection with Chinese Patent Application No. 201680008551.

* cited by examiner

POLYMERIZABLE COMPOSITION, WAVELENGTH CONVERSION MEMBER, BACKLIGHT UNIT, AND LIQUID CRYSTAL DISPLAY DEVICE

CROSS-REFERENCE TO RELATED APPLICATIONS

This application is a continuation application of International Application No. PCT/JP2016/000610, filed Feb. 5, 2016, which was published under PCT Article 21(2) in Japanese, the disclosure of which is incorporated herein by reference in its entirety. Further, this application claims priority from Japanese Patent Application No. 2015-021921, filed Feb. 6, 2015, the disclosure of which is incorporated herein by reference in its entirety.

BACKGROUND OF THE INVENTION

1. Field of the Invention

The present invention relates to a polymerizable composition for preparing a wavelength conversion layer including quantum dots, a wavelength conversion member, a backlight unit, and a liquid crystal display device.

2. Description of the Related Art

A flat panel display such as a liquid crystal display device (hereinafter referred to as "LCD") has been more widely used as a space-saving image display device having low power consumption.

A liquid crystal display device includes at least a backlight and a liquid crystal cell and typically further includes a member such as a backlight-side polarizing plate or a visible-side polarizing plate.

Recently, a configuration in which a wavelength conversion layer including quantum dots (QDs) as a light emitting material is provided in a wavelength conversion member of a backlight unit in order to improve color reproducibility of an LCD has attracted attention (refer to JP2013-544018A). The wavelength conversion member converts the wavelength of light incident from a light source so as to emit white light. In the wavelength conversion layer including quantum dots as a light emitting material, white light can be realized using fluorescence which is emitted by excitation of two or three kinds of quantum dots having different light emitting properties caused by light incident from a light source.

The fluorescence emitted from the quantum dots has high brightness and a small full width at half maximum. Therefore, an LCD using quantum dots has excellent color reproducibility. Due to the progress of such a three-wavelength light source technique using quantum dots, the color reproduction range of an LCD has widened from 72% to 100% in terms of National Television System Committee (NTSC) ratio.

SUMMARY OF THE INVENTION

As described above, one of the advantageous effects of the wavelength conversion member including quantum dots is that high-brightness white light can be obtained. However, it was found that the brightness may decrease in an outer peripheral region of a display surface in a liquid crystal display device that includes a wavelength conversion member including quantum dots. Such a partial brightness unevenness brings about deterioration in the quality of an image displayed on the display surface of the liquid crystal display device and thus is required to be suppressed.

The present inventors performed an investigation on the reason for a decrease in brightness in an outer peripheral region of a display surface and presumed that the reason is as follows.

Quantum dots have a problem in that the emission efficiency decreases due to a photooxidation reaction when coming into contact with oxygen. Regarding this point, JP2013-544018A discloses a configuration in which a barrier layer is laminated on a film (wavelength conversion layer) including quantum dots in order to protect the quantum dots from oxygen and the like.

On the other hand, when a wavelength conversion member is processed into a product, a wavelength conversion member having a product size is cut (for example, is punched using a punching machine) from a sheet-shaped wavelength conversion member original fabric. However, in the product which is cut as described above, a barrier layer is not present on an end surface, and thus there is a concern that the emission efficiency of quantum dots may decrease due to permeation of oxygen through the end surface. The present inventors thought that a decrease in the emission efficiency of the quantum dots caused by the permeation of oxygen through the end surface or through an end portion of an interface with an adjacent layer may cause the above-described decrease in brightness in an outer peripheral region of a display surface.

Therefore, the present inventors thought that it is preferable to reduce the oxygen permeability of a wavelength conversion layer itself in order to suppress a decrease in the emission efficiency of quantum dots caused by the permeation of oxygen through the end surface or through an end portion of an interface with an adjacent layer.

Such a wavelength conversion layer can be formed as a cured layer of a polymerizable composition including quantum dots and a polymerizable compound. The present inventors thought that the oxygen permeability of the wavelength conversion layer itself can be reduced by using a compound having a LogP value of 3.0 or lower as the polymerizable compound. The reason for this is as follows. It can be said that the compound having a LogP value of 3.0 or lower is a compound having higher polarity than oxygen as a nonpolar molecule, and a wavelength conversion layer which is formed of a polymerizable composition including a large amount of the above-described compound has poor compatibility with oxygen. Therefore, oxygen is not likely to permeate into the wavelength conversion layer.

However, it was found that, in a case where quantum dots coordinated with a ligand are added to the compound having a LogP value of 3.0 or lower, the dispersion stability significantly deteriorates, and aggregation and precipitation of the quantum dots may occur. In general, the ligand of the quantum dots has a saturated hydrocarbon chain having 6 or more carbon atoms, and this portion faces the outside of the quantum dots. Therefore, a surface of the quantum dots is likely to be hydrophobic. Thus, it is thought that the dispersion stability of the quantum dots in a hydrophilic polymerizable compound having a low LogP value deteriorates.

In order to improve the dispersion stability of quantum dots in a matrix, for example, JP2012-525467A discloses a method of exchanging a ligand with a compound having high affinity with a matrix component. Further. JP2012-525467A describes that a matrix may include a crosslinker having a group which forms a covalent bond with a ligand.

In addition, JP2008-285753A discloses a configuration of substituting surfaces of nanocrystalline particles with two different surfactants. However, it is generally known that ligand exchange causes a decrease in the emission efficiency of quantum dots (for example, refer to JP2011-514879A), and thus ligand exchange is not preferable from the viewpoint of realizing a high-brightness display device.

The present invention has been made in consideration of the above-described circumstances, and an object thereof is to provide a polymerizable composition in which the dispersion stability of quantum dots in a hydrophilic polymerizable compound is improved and with which a display device having high brightness and a suppressed decrease in brightness in an outer peripheral region can be obtained.

In addition, another object of the present invention is to provide a wavelength conversion member, a backlight unit, and a liquid crystal display device having high brightness and a suppressed decrease in brightness in an outer peripheral region.

According to the present invention, there is provided a polymerizable composition comprising: quantum dots having surfaces coordinated with a ligand; a polymerizable compound; and a dispersant, in which the ligand is a molecule that includes a saturated hydrocarbon chain having 6 or more carbon atoms and a coordinating group, a LogP value of the polymerizable compound is 3.0 or lower, the dispersant has a nonpolar portion and a polar portion in a molecule, and the nonpolar portion is at least one selected from the group consisting of a saturated hydrocarbon chain having 6 or more carbon atoms, an aromatic ring, and a saturated aliphatic ring.

It is preferable that the quantum dots are at least one kind of quantum dots selected from the group consisting of quantum dots having a center emission wavelength in a wavelength range of 600 nm to 680 nm, quantum dots having a center emission wavelength in a wavelength range of 520 nm to 560 nm, and quantum dots having a center emission wavelength in a wavelength range of 430 nm to 480 nm.

It is preferable that the ligand is covered with the dispersant.

Here, "covered" represents a state where the nonpolar portion of the dispersant is interposed between molecules of the ligand, the quantum dots including the ligand entangle with the dispersant, and the polar portion of the dispersant is positioned outside of the ligand in the quantum dots.

It is preferable that the coordinating group is an amino group, a phosphine group, or a phosphine oxide group.

It is preferable that the polar portion is at least one selected from the group consisting of an ammonium ion, an acid anhydride, a hydroxyl group, an amino group, a mercapto group, a carboxy group, an aldehyde group, a phosphate group, a sulfo group, a carbonyl group, an ether bond, an ester bond, an amide bond, and an ethylene oxide chain.

It is preferable that the polymerizable compound is at least one selected from the group consisting of a compound having an epoxy group and a (meth)acrylate compound.

It is preferable that the polymerizable compound is an alicyclic epoxy compound.

It is preferable that the polymerizable compound is a monofunctional (meth)acrylate compound.

The polymerizable composition according to the present invention may further comprise a photopolymerization initiator.

It is preferable that a wavelength conversion member comprises a wavelength conversion layer which is formed by curing the polymerizable composition according to the present invention.

It is more preferable that the wavelength conversion layer is formed by curing the polymerizable composition by light irradiation.

It is preferable that the wavelength conversion member according to the present invention further comprises a barrier film having an oxygen permeability of 1.00 $cm^3/(m^2 \cdot day \cdot atm)$ or lower, in which at least one of two main surfaces of the wavelength conversion layer is in contact with the barrier film.

Here, the oxygen permeability refers to a value measured under conditions of measurement temperature: 23° C. and relative humidity: 90% RH. An oxygen permeability of 1.00 $cm^3/(m^2 \cdot day \cdot atm)$ corresponds to $1.14 \times 10^{-1}$ fm/(S·Pa) in SI units.

In the wavelength conversion member according to the present invention, it is preferable that two barrier films having an oxygen permeability of 1.00 $cm^3/(m^2 \cdot day \cdot atm)$ or lower are provided and that the two main surfaces of the wavelength conversion layer are in contact with the two barrier films, respectively.

According to the present invention, there is provided a backlight unit comprising at least the wavelength conversion member according to the present invention and a light source.

According to the present invention, there is provided a liquid crystal display device comprising at least the backlight unit according to the present invention and a liquid crystal cell.

A polymerizable composition according to the present invention includes: quantum dots having surfaces coordinated with a ligand; a polymerizable compound; and a dispersant, in which the ligand is a molecule that includes a saturated hydrocarbon chain having 6 or more carbon atoms and a coordinating group, a LogP value of the polymerizable compound is 3.0 or lower, the dispersant has a nonpolar portion and a polar portion in a molecule, and the nonpolar portion is at least one selected from the group consisting of a saturated hydrocarbon chain having 6 or more carbon atoms, an aromatic ring, and a saturated aliphatic ring. According to the above-described configuration, the dispersant has a nonpolar portion and a polar portion in a molecule. Therefore, the quantum dots having surfaces covered with a hydrophobic saturated hydrocarbon chain can be favorably dispersed in a hydrophilic polymerizable compound having a LogP value of 3.0 or lower.

DESCRIPTION OF THE PREFERRED EMBODIMENTS

Figure 1:
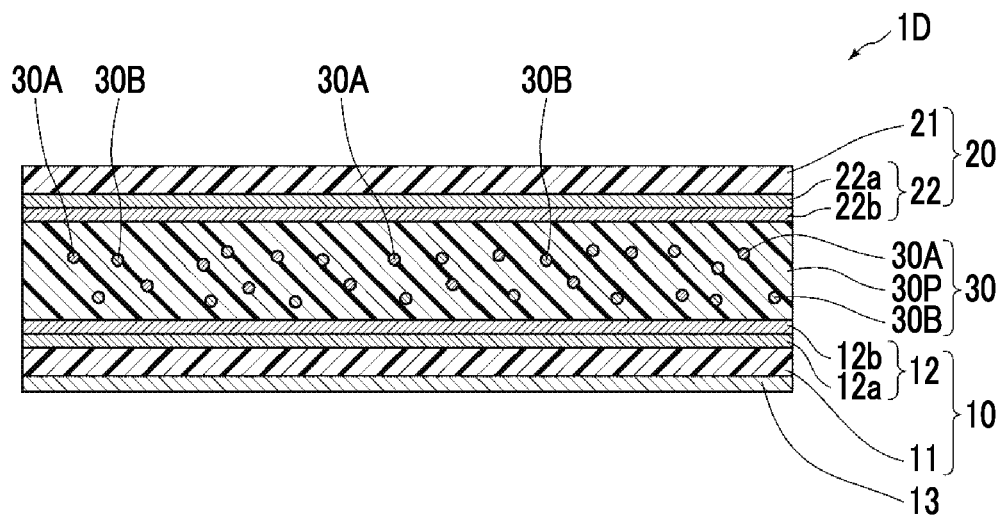
FIG. 1 is a cross-sectional view schematically showing a wavelength conversion member according to an embodiment of the present invention.

Hereinafter, an embodiment of the present invention will be described with reference to the drawings. The following description has been made based on a representative embodiment of the present invention. However, the present invention is not limited to the embodiment.

In this specification, numerical ranges represented by "to" include numerical values before and after "to" as lower limit values and upper limit values. In addition, in this specification, "full width at half maximum" of a peak refers to the width of the peak at ½ of the height of the peak. In addition, a (meth)acryloyl group represents either or both of an acryloyl group and a methacryloyl group. In addition, light having a center emission wavelength in a wavelength range of 430 to 480 nm is called blue light, light having a center emission wavelength in a wavelength range of 520 to 560 nm is called green light, and light having a center emission wavelength in a wavelength range of 600 to 680 nm is called red light.

[Polymerizable Composition]

A polymerizable composition according to the present invention includes: quantum dots having surfaces coordinated with a ligand; a polymerizable compound; and a dispersant, in which the ligand is a molecule that includes a saturated hydrocarbon chain having 6 or more carbon atoms and a coordinating group, a LogP value of the polymerizable compound is 3.0 or lower, the dispersant has a nonpolar portion and a polar portion in a molecule, and the nonpolar portion is at least one selected from the group consisting of a saturated hydrocarbon chain having 6 or more carbon atoms, an aromatic ring, and a saturated aliphatic ring.

Hereinafter, the details of the polymerizable composition according to the present invention will be described.

(Quantum Dots)

As the quantum dots, core-shell semiconductor nanoparticles are preferable from the viewpoint of improving durability. As a core, II-VI semiconductor nanoparticles, III-V semiconductor nanoparticles, and multi-component semiconductor nanoparticles can be used. Specific examples of the core include CdSe, CdTe, CdS, ZnS, ZnSe, ZnTe, InP, InAs, InGaP, and $CuInS_2$, but the present invention is not limited thereto. Among these, CdSe, CdTe, InP, InGaP, or $CuInS_2$ is preferable from the viewpoint of emitting visible light with high efficiency. As a shell, CdS, ZnS, ZnO, GaAs, and a complex thereof can be used, but the present invention is not limited thereto.

The polymerizable composition includes at least one kind of quantum dots selected from the group consisting of quantum dots having a center emission wavelength in a wavelength range of 600 nm to 680 nm, quantum dots having a center emission wavelength in a wavelength range of 520 nm to 560 nm, and quantum dots having a center emission wavelength in a wavelength range of 430 nm to 480 nm.

The quantum dots are excited by excitation light to emit fluorescence. The polymerizable composition can include, as the quantum dots, two or more kinds of quantum dots having different light emitting properties. In the embodiment, in a case where blue light is used as the excitation light, the quantum dots include quantum dots which are excited by blue light $L_B$ to emit fluorescence (red light) $L_R$ and quantum dots which are excited by the blue light $L_B$ to emit fluorescence (green light) $L_G$. In addition, in a case where ultraviolet light is used as the excitation light, the polymerizable composition can include quantum dots which are excited by ultraviolet light $L_{UV}$ to emit fluorescence (red light) $L_R$, quantum dots which are excited by the ultraviolet light $L_{UV}$ to emit fluorescence (green light) $L_G$, and quantum dots which are excited by the ultraviolet light $L_{UV}$ to emit fluorescence (blue light) $L_B$.

(Ligand and Coordinating Group)

The quantum dots have surfaces coordinated with a ligand. As the ligand, a molecule that includes a saturated hydrocarbon chain having 6 or more carbon atoms and a coordinating group can be used. Examples of the coordinating group include an amino group, a carboxy group, a mercapto group, a phosphine group, and a phosphine oxide group. From the viewpoint of improving the emission efficiency of the quantum dots, an amino group, a phosphine group, or a phosphine oxide group is preferable. Specific examples of the ligand include hexylamine, decylamine, hexadecylamine, octadecylamine, oleylamine, myristylamine, laurylamine, trioctylphosphine, trioctylphosphine oxide, oleic acid, stearic acid, 1-octanethiol. However, the present invention is not limited to the examples. Among these, a primary amine such as hexylamine, decylamine, hexadecylamine, or octadecylamine, or trioctylphosphine oxide is preferable from the viewpoint of improving the emission efficiency of the quantum dots.

The quantum dots coordinated with the ligand can be synthesized, for example, using a method described in J. AM. Chem. Soc., 115, pp. 8706-8715 (1993) or Phys. Chem., 101, pp. 9463-9475 (1997). In addition, a commercially available product can be preferably used.

The quantum dots coordinated with the ligand may be added to the polymerizable composition in the form of particles or in the form of a dispersion in which they are dispersed in a solvent. It is preferable that the quantum dots are added in the form of a dispersion from the viewpoint of suppressing aggregation of particles of the quantum dots. The solvent used herein is not particularly limited. For example, 0.01 parts by mass to 10 parts by mass and preferably 0.05 parts by mass to 5 parts by mass of the quantum dots can be added with respect to 100 parts by mass of the total mass of the polymerizable composition.

(Dispersant)

It is preferable that the ligand is covered with the dispersant. The dispersant is a compound that has a nonpolar portion and a polar portion in a molecule.

The nonpolar portion is at least one selected from the group consisting of a saturated hydrocarbon chain having 6 or more carbon atoms, an aromatic ring, and a saturated aliphatic ring. As the aromatic ring having 6 or more carbon atoms, a benzene ring is preferable. In addition, as the saturated aliphatic ring having 6 or more carbon atoms, a cyclohexane ring is preferable. Among these, a saturated hydrocarbon chain is more preferable. The saturated hydrocarbon chain represents an alkyl group or an alkylene group. In addition, the alkyl group and the alkylene group may be linear or branched.

It is preferable that the polar portion is at least one selected from the group consisting of an ammonium ion, an acid anhydride, a hydroxyl group, an amino group, a mercapto group, a carboxy group, an aldehyde group, a phosphate group, a sulfo group, a carbonyl group, an ether bond, an ester bond, an amide bond, and an ethylene oxide chain. Among these, a hydroxyl group, an amino group, a carboxy group, an ester bond, an amide bond, or an ethylene oxide chain is preferable. The ethylene oxide chain represents a structure in which at least one hydrogen atom of ethylene oxide is substituted with a saturated hydrocarbon chain.

The amino group represents $-NH^2$, $-NHR^{11}$, or $-NR^{11}R^{12}$. $R^{11}$ and $R^{12}$ each independently represent an alkyl group having preferably 6 or more carbon atoms, more preferably 6 to 30 carbon atoms, and still more preferably 6 to 18 carbon atoms.

As the dispersant, a compound represented by the following Compound A is preferable.

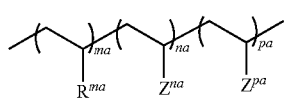

Compound A $R^{ma}$ represents a group having a nonpolar portion and a polar portion. As the nonpolar portion, an alkyl group having 6 or more carbon atoms, an alkylene group is preferable. As the polar portion, an amide bond is preferable. $R^{ma}$ more preferably represents $-C(=O)NHR^1$. $R^1$ represents an alkyl group preferably having 6 or more carbon atoms, more preferably 6 to 30 carbon atoms, and still more preferably 6 to 18 carbon atoms.

$Z^{na}$ and $Z^{pa}$ each independently represent a group having a polar portion. It is preferable that the polar portion is at least one selected from the group consisting of an ammonium ion, an acid anhydride, a hydroxyl group, an amino group, a mercapto group, a carboxy group, an aldehyde group, a phosphate group, a sulfo group, a carbonyl group, an ether bond, an ester bond, an amide bond, and an ethylene oxide chain. Among these, a carboxy group, an ester bond, or an ethylene oxide chain is more preferable.

In addition, as a preferable combination of $Z^{na}$ and $Z^{pa}$, $Z^{na}$ represents a group including at least one selected from a carboxy group and a hydroxy group, and $Z^{pa}$ represents a group including at least one selected from an ester bond and an ethylene oxide chain.

By changing a ratio between ma, na, and pa, a balance between hydrophobicity and hydrophilicity can be adjusted. As a result, the dispersion stability in the polymerizable compound can be improved. Specifically, ma:(na+pa) is preferably 1:9 to 9:1 and more preferably 5:5 to 9:1. In addition, pa may represent 0.

Examples of the compound A include the following compounds A1, A3, and A4.

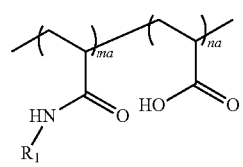

Compound A1

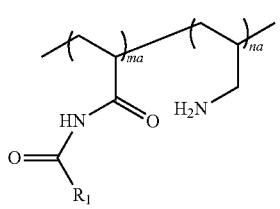

Compound A3

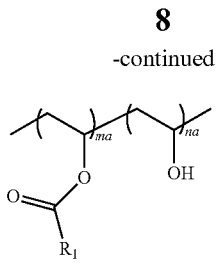

Compound A4

Regarding a ratio between ma and na, ma:na is 5:5 to 9:1. $R_1$ represents at least one of a saturated hydrocarbon chain having 6 or more carbon atoms, an aromatic ring, or a saturated aliphatic ring and more preferably a saturated hydrocarbon chain. As the saturated hydrocarbon chain, an alkyl group having 6 or more carbon atoms is preferable, an alkyl group having 6 to 30 carbon atoms is more preferable, and an alkyl group having 6 to 18 carbon atoms is still more preferable.

The compound A can include a functional group which is polymerizable with the polymerizable compound. For example, in a case where epoxy is used as the polymerizable compound, it is preferable that the compound A includes a glycidyl group. Specifically, for example, the following compound A2 can be used.

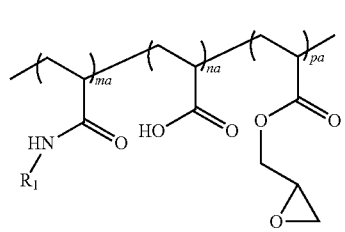

Compound A2

Regarding a ratio between ma, na, and pa, ma:(na+pa) is preferably 5:5 to 9:1, and na:pa is preferably 1:9 to 9:1. $R_1$ has the same definition and the same preferable range as $R_1$ in the compound A1.

Further, specific examples of the dispersant include the following compound B1.

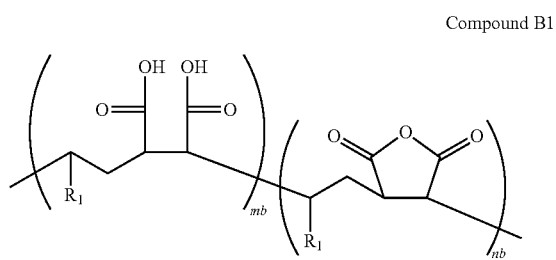

Compound B1

Regarding a ratio between mb and nb, mb:nb is 5:5 to 9:1. $R_1$ has the same definition and the same preferable range as $R_1$ in the compound A1.

Further, specific examples of the dispersant include the following compound C.

Compound C

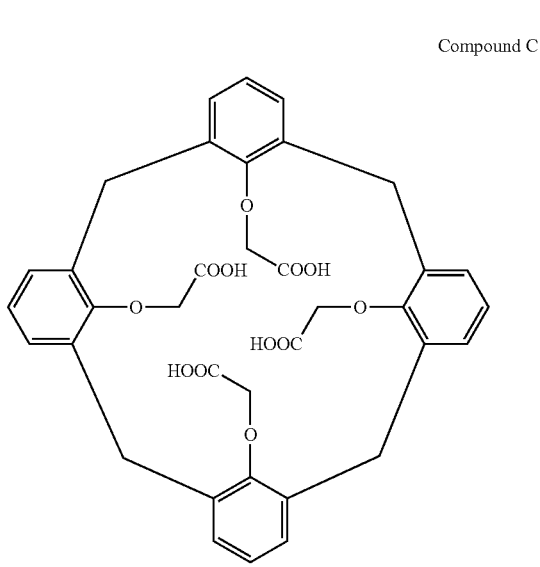 [SMILES: O=C(O)COc1c2cccc1Cc1cccc(c1OCC(=O)O)Cc1cccc(c1OCC(=O)O)Cc1cccc(c1OCC(=O)O)C2]

Further, specific examples of the dispersant include the following compound D.

Compound D

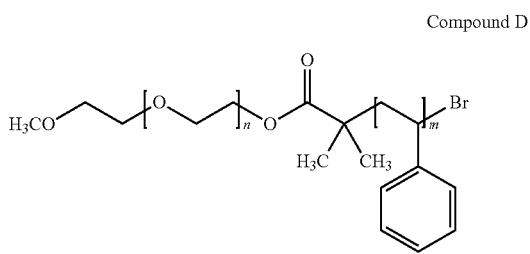

A ratio between n and m is preferably 1:5 to 1:20.

Further, specific examples of the dispersant include the following compound E.

Compound E

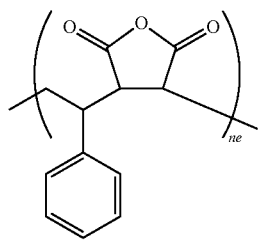

From the viewpoint of favorably covering the quantum dots coordinated with the ligand, the weight average molecular weight Mw of the dispersant is preferably 500 to 20000 and 1000 to 5000.

Here, the weight average molecular weight Mw is a weight average molecular weight in terms of polystyrene converted from a value measured by gel permeation chromatography (GPC). In the measurement, HLC-8120 (manufactured by Tosoh Corporation) is used as a GPC device, TSK gel Multipore XL-M (manufactured by Tosoh Corporation, 7.8 mm ID (Inner Diameter)×30.0 cm) is used as a column, and tetrahydrofuran (THF) is used as an eluent.

(Polymerizable Compound)

A LogP value of the polymerizable compound is 3.0 or lower. The LogP value is preferably 2.5 or lower and more preferably 2.0 or lower. The LogP value is preferably 0.5 or higher but may be lower than 0.5. It is preferable that the LogP value is 0.5 or higher because the quantum dots are more easily dispersed in the polymerizable composition including the polymerizable compound.

The Log P value is an index for hydrophilicity, in which the lower the LogP value, the higher the polarity. On the other hand, oxygen is a nonpolar molecule. A compound having a LogP value of 3.0 or lower has higher polarity than oxygen. Therefore, it is thought that, in a wavelength conversion layer which is formed of a polymerizable composition including a large amount (specifically 70 parts by mass or more with respect to 100 parts by mass of the total mass of the composition) of the above-described compound has poor compatibility with oxygen. Therefore, oxygen is not likely to permeate into the wavelength conversion layer. The present inventors presumed that this configuration contributes to suppressing the above-described decrease in the emission efficiency of quantum dots caused by permeation of oxygen through an end surface of a cut wavelength conversion layer or through an end portion of an interface with an adjacent layer.

In the present invention and this specification, the LogP value refers to a logarithm value of a partition coefficient between 1-octanol and water. The LogP value can be obtained by calculation using a fragment method, an atom approach method, or the like. The LogP value described in this specification is calculated using ChemBioDraw Ultra 12.0 (manufactured by PerkinElmer Inc) based on a structure of a compound.

As the polymerizable compound, for example, a compound having an epoxy group having a LogP value of 3.0 or lower or a (meth)acrylate compound can be used. Among these, a monofunctional (meth)acrylate compound having a LogP value of 3.0 or lower or an alicyclic epoxy compound having a LogP value of 3.0 or lower is preferable because shrinkage during curing can be suppressed. Further, from the viewpoint of reducing the oxygen permeability of the wavelength conversion layer and increasing curing properties, an alicyclic epoxy compound having a LogP value of 3.0 or lower is more preferable.

Monofunctional (Meth)Acrylate Compound

As the monofunctional (meth)acrylate compound which can be used as the polymerizable compound, for example, acrylic acid, methacrylic acid, or a derivative thereof can be used. More specifically, a monomer having one polymerizable unsaturated bond ((meth)acryloyl group) of (meth)acrylic acid in the molecule can be used. Hereinafter, specific examples of the monofunctional (meth)acrylate monomer include the following compounds, but the present invention is not limited thereto. Specific examples include n-butyl (meth)acrylate, isobutyl (meth)acrylate, benzyl (meth)acrylate, 2-phenoxyethyl (meth)acrylate, 1,4-cyclohexanedimethanol monoacrylate, butoxyethyl (meth)acrylate, N,N-dimethylaminoethyl (meth)acrylate, cyclohexyl (meth)acrylate, 2-hydroxyethyl (meth)acrylate, 2-hydroxypropyl (meth)acrylate, 4-hydroxybutyl (meth)acrylate, and a (meth)acrylate derivative having an adamantane skeleton. The acrylic acid represents either or both acrylic acid and methacrylic acid. In addition, the (meth)acrylate represents either or both acrylate and methacrylate.

Alicyclic Epoxy Compound

The polymerizable compound may be an alicyclic epoxy compound. The alicyclic epoxy compound includes at least one alicyclic epoxy group. Here, the alicyclic epoxy group refers to a monovalent substituent having a condensed ring of an epoxy ring and a saturated hydrocarbon ring and preferably a monovalent substituent having a condensed ring of an epoxy ring and a cycloalkane ring. Preferable examples of the alicyclic epoxy compound include a compound having one or more structures shown below in one molecule, in which an epoxy ring and a cyclohexane ring are condensed. As the alicyclic epoxy compound, one kind may be used, or two or more kinds having different structures may be used. In the following description, in a case where two or more kinds having different structures are used as the alicyclic epoxy compound, the content of the alicyclic epoxy compound refers to the total content thereof. The same shall be applied to a case where two or more kinds having different structures are used as other components. The alicyclic epoxy compound has higher curing properties by light irradiation than an aliphatic epoxy compound. It is preferable that a polymerizable compound having excellent photocuring properties from the viewpoints of improving productivity and forming a layer in which an irradiated portion and a non-irradiated portion have uniform properties. As a result, in the wavelength conversion member, the curling of the wavelength conversion layer can be suppressed, and the quality can be made to be uniform. In general, an epoxy compound is likely to have a reduced curing shrinkage during photocuring. This point is advantageous in forming a smooth wavelength conversion layer having reduced deformation.

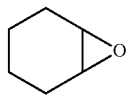

The number of the structures included in one molecule may be two or more and is preferably one or two. In addition, the structure may include one or more substituents. Examples of the substituent include an alkyl group, a hydroxyl group, an alkoxy group, a halogen atom, a cyano group, an amino group, a nitro group, an acyl group, and a carboxyl group. Examples of the alkyl group include an alkyl group having 1 to 6 carbon atoms. Examples of the alkoxy group include an alkoxy group having 1 to 6 carbon atoms. Examples of the halogen atom include a fluorine atom, a chlorine atom, and a bromine atom.

Examples of the alicyclic epoxy compound which can be used as the polymerizable compound include CELLOXIDE (registered trade name) 8000, CELLOXIDE (registered trade name) 2021P, and CELLOXIDE (registered trade name) 2000 (all of which are manufactured by Daicel Corporation). However, the present invention is not limited to the examples. Among these, CELLOXIDE 2021P is preferable from the viewpoints of reducing the LogP value and reducing the oxygen permeability of the wavelength conversion layer.

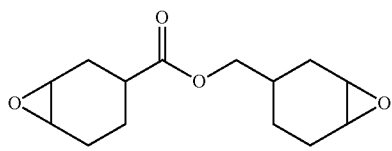 [SMILES: O=C(OCC1CCC2OC2C1)C1CCC2OC2C1]

The content of the polymerizable compound is preferably 50 parts by mass or more, more preferably 70 parts by mass to 99 parts by mass, and still more preferably 85 parts by mass to 98 parts by mass with respect to the total mass of the polymerizable composition.

(Photopolymerization Initiator)

Regarding the photopolymerization initiator, examples of IRGACURE (registered trade name) series which is commercially available from BASF SE include IRGACURE 290, IRGACURE 651, IRGACURE 754, IRGACURE 184, IRGACURE 2959, IRGACURE 907, IRGACURE 369, IRGACURE 379, and IRGACURE 819. In addition, examples of DAROCURE (registered trade name) include DAROCURE TPO and DAROCURE 1173. In addition, examples of ESACURE (registered trade name) which is commercially available from Lamberti S.p.A.) include ESACURE TZM, ESACURE TZT, and ESACURE KTO46. In addition, the first polymerizable composition may include a well-known radical polymerization initiator or a well-known cationic polymerization initiator. For example, the details can be found in paragraph "0037" of JP2013-043382A and paragraphs "0040" to "0042" of JP2011-159924A.

The content of the photopolymerization initiator is preferably 0.1 to 10 parts by mass, more preferably 0.2 to 8 parts by mass, and still more preferably 0.2 to 5 parts by mass with respect to 100 parts by mass of the polymerizable composition.

(Other Additives)

The polymerizable composition according to the present invention may include a viscosity adjuster, a solvent, a silane coupling agent, and the like.

Viscosity Adjuster

Optionally, the polymerizable composition may include a viscosity adjuster. By adding a viscosity adjuster to the polymerizable composition, the viscosity thereof can be adjusted to a desired value. It is preferable that the viscosity adjuster is a filler having a particle size of 5 nm to 300 nm. In addition, the viscosity adjuster may be a thixotropic agent. In the present invention and this specification, thixotropy refers to a property in which the viscosity of a liquid composition decreases along with an increase in shear rate, and the thixotropic agent refers to a material which has a function of imparting thixotropy to a liquid composition when added to the liquid composition. Specific examples of the thixotropic agent include fumed silica, alumina, silicon nitride, titanium dioxide, calcium carbonate, zinc oxide, talc, mica, feldspar, kaolinite (kaolin clay), pyrophyllite (pyrophyllite clay), sericite, bentonite, smectite and vermiculite (for example, montmorillonite, nontronite, or saponite), organic bentonite, and organic smectite.

Solvent

Optionally, the polymerizable composition may include a solvent. As the solvent, an organic solvent is preferably used. Examples of the organic solvent include amides (for example, N,N-dimethylformamide), sulfoxides (for example, dimethylsulfoxide), heterocyclic compounds (for example, pyridine), hydrocarbons (for example, benzene, hexane, or toluene), alkyl halides (for example, chloroform or chloromethane), esters (for example, methyl acetate, ethyl acetate, or butyl acetate), ketones (for example, acetone or methyl ethyl ketone), and ethers (for example, tetrahydrofuran or 1,2-dimethoxyethane).

In this case, the kind and addition amount of the solvent used are not particularly limited. From the viewpoint of optimizing the viscosity of the polymerizable composition, the addition amount is preferably 50 to 500 parts by mass with respect to 100 parts by mass of the polymerizable composition.

Silane Coupling Agent

The polymerizable composition may further include a silane coupling agent. The wavelength conversion layer which is formed of the polymerizable composition including a silane coupling agent has strong adhesiveness with an adjacent layer due to the silane coupling agent and thus exhibits excellent weather fastness. The main reason for this is that the silane coupling agent included in the wavelength conversion layer forms a covalent bond between a surface of the adjacent layer and a constituent element of the wavelength conversion layer through a hydrolysis reaction or a condensation reaction. At this time, it is also preferable that an inorganic layer described below is provided as the adjacent layer. In addition, in a case where the silane coupling agent includes a reactive functional group such as a radically polymerizable group, the formation of a cross-linking structure with a monomer component constituting the wavelength conversion layer can also contribute to improvement of adhesiveness between the wavelength conversion layer and the adjacent layer. In this specification, the silane coupling agent included in the wavelength conversion layer also refers to the silane coupling agent after the above-described reaction.

As the silane coupling agent, a well-known silane coupling agent can be used without any particular limitation. Examples of the silane coupling agent which is preferable from the viewpoint of adhesiveness include a silane coupling agent represented by Formula (1) described in JP2013-43382A. The details can be found in paragraphs "0011" to "0016" of JP2013-43382A. The amount of the additives such as a silane coupling agent used is not particularly limited and can be appropriately set.

A method of preparing the polymerizable composition is not particularly limited and may be prepared according to a preparation procedure of a general polymerizable composition.

Next, a wavelength conversion member according to an embodiment of the present invention and a backlight unit including the wavelength conversion member will be described with reference to the drawings. FIG. 1 is a cross-sectional view showing a schematic configuration of the wavelength conversion member according to the embodiment.

[Wavelength Conversion Member]

As shown in FIG. 1, a wavelength conversion member 1D according to the embodiment includes: a wavelength conversion layer 30 that is formed by curing the polymerizable composition; and barrier films 10 and 20 that are disposed on opposite main surfaces of the wavelength conversion layer 30, respectively. Here, "main surface" refers to a surface (a front surface or a rear surface) of the wavelength conversion layer which is disposed on a visible side or a backlight side in a case where the wavelength conversion member is used in a liquid crystal display device described below. The same can also be applied to main surfaces of other layers and members. The barrier films 10 and 20 include barrier layers 12 and 22 and supports 11 and 21, respectively, from the wavelength conversion layer 30 side. Hereinafter, the details of the wavelength conversion layer 30, the barrier films 10 and 20, the supports 11 and 21, and the barrier layers 12 and 22 will be described.

(Wavelength Conversion Layer)

As shown in FIG. 1, in the wavelength conversion layer 30, quantum dots 30A and quantum dots 30B are dispersed in an organic matrix 30P, in which the quantum dots 30A are excited by the blue light $L_B$ to emit the fluorescence (red light) $L_R$, and the quantum dots 30B are excited by the blue light $L_B$ to emit the fluorescence (green light) $L_G$. In FIG. 1, the quantum dots 30A and 30B are enlarged and shown in order to easily recognize the quantum dots. Actually, for example, the thickness of the wavelength conversion layer 30 is 50 to 100 μm, and the diameter of the quantum dots is about 2 to 7 nm.

Surfaces of the quantum dots 30A and 30B are coordinated with the ligand. The wavelength conversion layer 30 is formed by curing the polymerizable composition according to the present invention by light irradiation or heat, the polymerizable composition including the quantum dots 30A and 30B coordinated with the ligand and the polymerizable compound. It is more preferable that the wavelength conversion layer is formed by curing the polymerizable composition by light irradiation because a layer having high productivity and uniform properties can be formed. The organic matrix 30P is formed by curing the polymerizable compound.

The thickness of the wavelength conversion layer 30 is preferably in a range of 1 to 500 μm, more preferably in a range of 10 to 250 μm, and still more preferably in a range of 30 to 150 μm. It is preferable that the thickness is 1 μm or more because a high wavelength conversion effect can be obtained. In addition, it is preferable that the thickness is 500 μm or less because, in a case where the wavelength conversion member is incorporated into a backlight unit, the thickness of the backlight unit can be reduced.

In the description of the embodiment, the light source emitting blue light is used as the light source. Alternatively, in the wavelength conversion layer 30, the quantum dots 30A, the quantum dots 30B, and quantum dots 30C (not shown) may be dispersed in the organic matrix 30, in which the quantum dots 30A are excited by the ultraviolet light $L_{UV}$ to emit the fluorescence (red light) $L_R$, the quantum dots 30B are excited by the ultraviolet light $L_{UV}$ to emit the fluorescence (green light) $L_G$, and the quantum dots 30C are excited by the ultraviolet light $L_{UV}$ to emit the fluorescence (blue light) $L_B$. The shape of the wavelength conversion layer is not particularly limited and may be an arbitrary shape.

(Barrier Film)

The barrier films 10 and 20 are films having a gas harrier function of blocking oxygen. In the embodiment, the barrier layers 12 and 22 are provided on the supports 11 and 21, respectively. Due to the presence of the supports 11 and 21, the strength of the wavelength conversion member 1D is improved, and the respective layers can be easily manufactured.

In the barrier films 10 and 20 according to the embodiment, the harrier layers 12 and 22 are supported by the supports 11 and 21. The barrier layers 12 and 22 are not necessarily supported by the supports 11 and 21. In addition, in the wavelength conversion member according to the embodiment, the barrier layers 12 and 22 are adjacent to opposite main surfaces of the wavelength conversion layer 30. In a case where the supports 11 and 21 have sufficient barrier properties, the barrier layers may consist of only the supports 11 and 21.

In addition, it is preferable that the wavelength conversion member includes the two barrier films 10 and 20 as in the embodiment. However, the wavelength conversion member may include only one barrier film.

The total light transmittance of the barrier films 10 and 20 in the visible range is 80% or higher and more preferably 90% or higher. The visible range refers to a wavelength range of 380 nm to 780 nm, and the total light transmittance refers to an average light transmittance value in the visible range.

The oxygen permeability of the barrier films 10 and 20 is preferably 1.00 $cm^3/(m^2 \cdot day \cdot atm)$ or lower. Here, the oxygen permeability is a value measured using an oxygen permeability measuring device (OX-TRAN 2/20 (trade name), manufactured by Mocon Inc.) under conditions of measurement temperature: 23° C. and relative humidity: 90% RH. The oxygen permeability of the barrier films 10 and 20 is more preferably 0.10 $cm^3/(m^2 \cdot day \cdot atm)$ or lower, and still more preferably 0.01 $cm^3/(m^2 \cdot day \cdot atm)$ or lower.

(Support)

In the wavelength conversion member 1D, at least one main surface of the wavelength conversion layer 30 is supported by the support 11 or 21. As in the embodiment, it is preferable that front and rear main surfaces of the wavelength conversion layer 30 are supported by the supports 11 and 21.

From the viewpoints of impact resistance and the like of the wavelength conversion member, the average thickness of the supports 11 and 21 is preferably 10 μm to 500 μm, more preferably 20 μm to 400 μm, and still more preferably 30 μm to 300 μm. In a configuration where the retroreflection of light is increased as in a case where the concentration of the quantum dots 30A and 30B in the wavelength conversion layer 30 is reduced or a case where the thickness of the wavelength conversion layer 30 is reduced, it is preferable that the absorbance of light at a wavelength of 450 inn is low. Therefore, from the viewpoint of suppressing a decrease in brightness, the average thickness of the supports 11 and 21 is preferably 40 μm or less and more preferably 25 μm or less.

In order to further reduce the concentration of the quantum dots 30A and 30B in the wavelength conversion layer 30 or to further reduce the thickness of the wavelength conversion layer 30, it is necessary that the number of times where the excitation light passes through the wavelength conversion layer is increased by providing means for increasing retroreflection of light, for example, a plurality of prism sheets in a renoreflecting member of a backlight unit described below to maintain the display color of an LCD. Accordingly, it is preferable that the support is a transparent support Which is transparent to visible light.

Here, "transparent to visible light" represents that the light transmittance in the visible range is 80% or higher and preferably 85% or higher. The light transmittance used as an index for transparency can be measured using a method described in JIS-K 7105. That is, using an integrating sphere light transmittance measuring device, the total light transmittance and the scattered light amount are measured, and the diffuse transmittance is subtracted from the total light transmittance to obtain the light transmittance. The details of the support can be found in paragraphs "0046" to "0052" of JP2007-290369A and paragraphs "0040" to "0055" of JP2005-096108A.

In addition, the in-plane retardation Re(589) of the supports 11 and 21 at a wavelength of 589 nm is preferably 1000 nm or lower, more preferably 500 nm or lower, and still more preferably 200 nm or lower.

When whether or not foreign matter or defects are present is inspected after the preparation of the wavelength conversion member 1D, foreign matter or defects can be easily found by disposing two polarizing plates at extinction positions and inserting the wavelength conversion member between the two polarizing plates to observe the wavelength conversion member. In a case where Re(589) of the support is in the above-described range, foreign matter or defects can be easily found during the inspection using the polarizing plates, which is preferable.

Here, Re(589) is measured using KOBRA-21ADH or KOBRA WR (manufactured by Oji Scientific Instruments Co., Ltd.) by causing light at a wavelength of 589 nm to be incident in a film normal direction. The measurement wavelength λ nm can be selected by manually changing a wavelength selective filter or changing a measured value using a program or the like.

As the supports 11 and 21, a support having barrier properties against oxygen and water is preferable. Preferable examples of the support include a polyethylene terephthalate film, a film which includes a polymer having a cyclic olefin structure, and a polystyrene film.

(Barrier Layer)

The barrier layers 12 and 22 include organic layers 12a and 22a and inorganic layers 12b and 2b in order from the supports 11 and 21 side, respectively. The organic layer 12a or 22a may be provided between the inorganic layer 12b or 22b and the wavelength conversion layer 30.

The barrier layer 12 or 22 is formed on a surface of the support 11 or 21. Accordingly, the barrier film 10 or 20 includes: the support 11 or 21; and the barrier layer 12 or 22 that is formed on the support 11 or 21. In a case where the barrier layer 12 or 22 is provided, it is preferable that the support has high heat resistance. In the wavelength conversion member 1D, a layer of the barrier film 10 or 20 which is adjacent to the wavelength conversion layer 30 may be an inorganic layer or an organic layer and is not particularly limited.

From the viewpoint of improving weather fastness, it is preferable that the barrier layer 12 or 22 includes a plurality of layers because barrier properties can be further improved. However, as the number of layers increases, the light transmittance of the wavelength conversion member is likely to decrease. Therefore, it is preferable that the barrier layer 12 or 22 is designed in consideration of excellent light transmittance and barrier properties.

Inorganic Layer

The inorganic layer is a layer including an inorganic material as a major component in which the content of the inorganic material is preferably 50 mass % or higher, more preferably 80 mass % or higher, and still more preferably 90 mass % or higher. Most preferably, the inorganic layer is a layer consisting of only an inorganic material. The inorganic layer 12b or 22b which is preferable for the barrier layer 12 or 22 is not particularly limited, and various inorganic compounds such as a metal, an inorganic oxide, an inorganic nitride, or an inorganic oxynitride can be used. As an element constituting the inorganic material, silicon, aluminum, magnesium, titanium, tin, indium, or cerium is preferable. The inorganic material may include one element or two or more elements among the above elements. Specific examples of the inorganic compound include silicon oxide, silicon oxynitride, aluminum oxide, magnesium oxide, titanium oxide, tin oxide, an indium oxide alloy, silicon nitride, aluminum nitride, and titanium nitride. In addition, as the inorganic layer, a metal film such as an aluminum film, a silver film, a tin film, a chromium film, a nickel film, or a titanium film may be provided.

In particular, an inorganic layer including a silicon oxide, a silicon nitride, a silicon oxynitride, a silicon carbide, or an aluminum oxide is preferable. The inorganic layer formed of the above materials has excellent adhesiveness with the organic layer. Therefore, in a case where a pin hole is formed on the inorganic layer, the organic layer can be effectively embedded in the pin hole, and barrier properties can be further suppressed.

In addition, it is more preferable that the inorganic barrier layer is formed of a silicon nitride from the viewpoint of suppressing light absorption in the barrier layer.

A method of forming the inorganic layer is not particularly limited. For example, various film forming methods in which a film forming material can be evaporated or scattered to be deposited on a deposition target surface can be used.

Examples of the method of forming the inorganic layer include: a vacuum deposition method of heating and depositing an inorganic material such as an inorganic oxide, an inorganic nitride, an inorganic oxynitride, or a metal; an oxidation deposition method of introducing oxygen gas and oxidizing an inorganic material as a raw material for deposition; a sputtering method of introducing argon gas and oxygen gas and sputtering an inorganic material as a target material for deposition; a physical vapor deposition (PVD) method, such as an ion plating method, of heating an inorganic material with a plasma beam generated by a plasma gun for deposition; and in a case where a deposited film formed of silicon oxide is formed, a chemical vapor deposition (CVD) method of using an organic silicon compound as a raw material.

The thickness of the inorganic layer may be 1 nm to 500 nm and is preferably 5 nm to 300 nm and more preferably 10 nm to 150 nm. By adjusting the thickness of the adjacent inorganic layer to be in the above-described range, light absorption in the inorganic layer can be suppressed while realizing excellent barrier properties, and the wavelength conversion member having a high light transmittance can be provided.

Organic Layer

"Organic layer" is a layer including an organic material as a major component in which the content of the organic material is preferably 50 mass % or higher, more preferably 80 mass % or higher, and still more preferably 90 mass % or higher. The details of the organic layer can be found in paragraphs "0020" to "0042" of JP2007-290369A and paragraphs "0074" to "0105" of JP2005-096108A. It is preferable that the organic layer includes a cardo polymer. As a result, adhesiveness between the organic layer and an adjacent layer, in particular, adhesiveness between the organic layer and the inorganic layer is improved, and more favorable barrier properties can be realized. The details of the cardo polymer can be found in paragraphs "0085" to "0095" of JP2005-096108A. The thickness of the organic layer is preferably in a range of 0.05 µm to 10 µm and more preferably in a range of 0.5 to 10 µm. In a case where the organic layer is formed using a wet coating method, the thickness of the organic layer is preferably in a range of 0.5 to 10 µm and more preferably in a range of 1 µm to 5 µm. In a case where the organic layer is formed using a dry coating method, the thickness of the organic layer is preferably in a range of 0.05 µm to 5 µm and more preferably in a range of 0.05 µm to 1 µm. By adjusting the thickness of the organic layer, which is formed using a wet coating method or a dry coating method, adhesiveness with the inorganic layer can be further improved.

Other details of the inorganic layer and the organic layer can be found in JP2007-290369A, JP2005-096108A, and US2012/0113672 A1.

In the wavelength conversion member 1D, the wavelength conversion layer, the inorganic layer, the organic layer, and the support may be laminated in this order. The support may be provided between the inorganic layer and the organic layer, between two organic layers, or between two inorganic layers.

(Unevenness Imparting Layer)

It is preferable that the barrier film 10 includes an unevenness imparting layer 13 which imparts an uneven structure to a surface of the barrier film opposite to the wavelength conversion layer 30 side. In a case where the barrier film 10 includes the unevenness imparting layer 13, blocking properties and slipping properties of the barrier film can be improved, which is preferable. It is preferable that the unevenness imparting layer is a layer including particles. Examples of the particles include inorganic particles such as silica, alumina, a metal oxide and organic particles such as crosslinked polymer particles. In addition, it is preferable that the unevenness imparting layer is provided on a surface of the barrier film opposite to the wavelength conversion layer. However, the mat layer may be provided on opposite surfaces of the barrier film.

The wavelength conversion member 1D may have a light scattering function for efficiently extracting the fluorescence of the quantum dots to the outside. The light scattering function may be provided in the wavelength conversion layer 30, or a layer having a light scattering function may be separately provided as a light scattering layer. The light scattering layer may be provided on a surface of the barrier layer 22 on the wavelength conversion layer 30 side, or may be provided on a surface of the support opposite to the wavelength conversion layer. In a case where the unevenness imparting layer is provided, it is preferable that the unevenness imparting layer also functions as a light scattering layer.

<Method of Manufacturing Wavelength Conversion Member>

Hereinafter, an example of a method of manufacturing the wavelength conversion member 1D in which the barrier films 10 and 20 are provided on opposite surfaces of the wavelength conversion layer 30 will be described, the substrates 10 and 20 including the barrier layers 12 and 22 on the supports 11 and 21.

In the embodiment, the wavelength conversion layer 30 can be formed by applying the prepared polymerizable composition to surfaces of the barrier films 10 and 20 and irradiating the quantum dot-containing polymerizable composition with light or heating the quantum dot-containing polymerizable composition to be cured. Examples of a coating method include various coating methods such as a curtain coating method, a dip coating method, a spin coating method, a printing coating method, a spray coating method, a slot coating method, a roll coating method, a slide coating method, a blade coating method, a gravure coating method, or a wire bar method.

Curing conditions can be appropriately set depending on the kind of the polymerizable compound used and the composition of the polymerizable composition. In addition, in a case where the polymerizable composition includes a solvent, a drying treatment is performed to remove the solvent before curing.

The polymerizable composition may be cured in a state where the polymerizable composition is interposed between the two supports. An aspect of steps of manufacturing the wavelength conversion member including a curing treatment will be described below with reference to FIGS. 2 and 3. However, the present invention is not limited to the following configuration.

Figure 2:
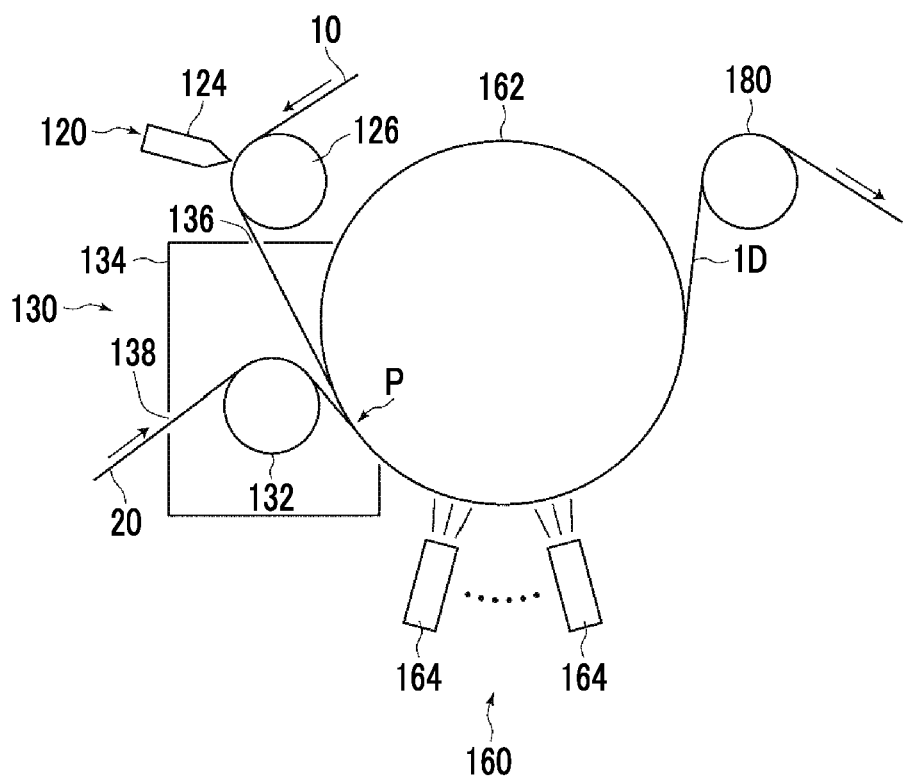
FIG. 2 is a diagram showing a schematic configuration of an example of a device for manufacturing the wavelength conversion member.
Figure 3:
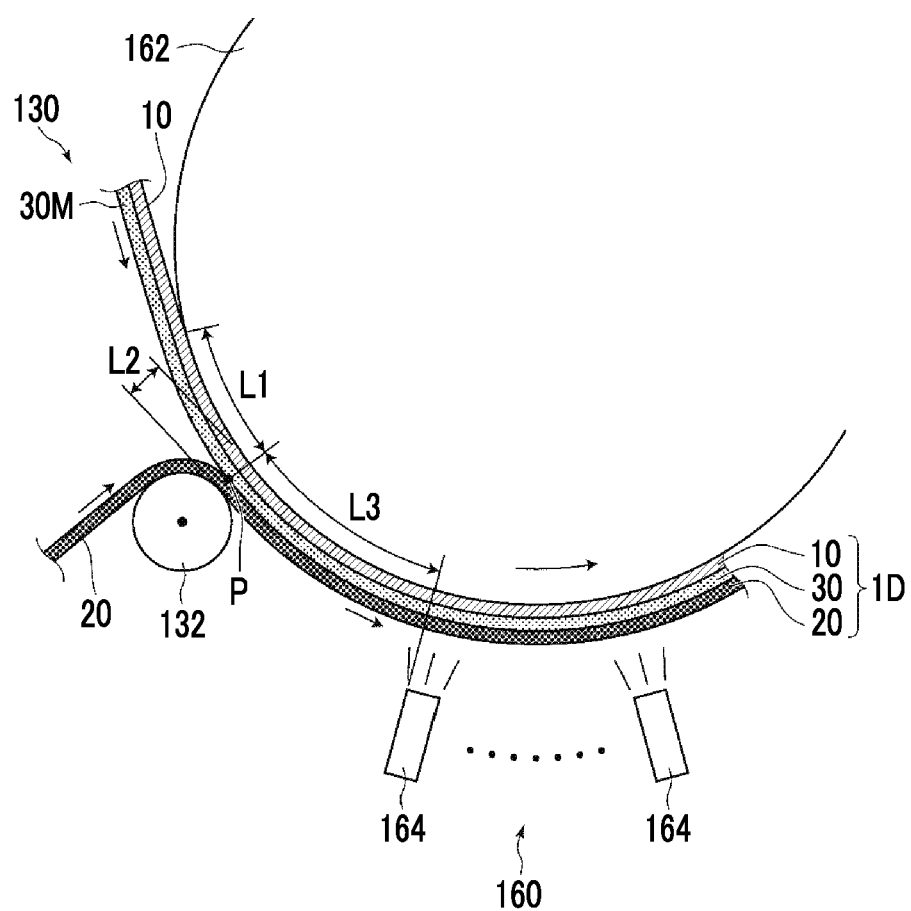
FIG. 3 is an enlarged view showing a part of the manufacturing device shown in FIG. 2.

FIG. 2 is a diagram showing a schematic configuration of an example of a device of manufacturing the wavelength conversion member 1D. FIG. 3 is an enlarged view showing a part of the manufacturing device shown in FIG. 2.

The manufacturing device according to the embodiment includes: a transporter (not shown); a coating portion 120 that applies the polymerizable composition to the first barrier film 10 (hereinafter, also referred to as "first film 10") to form a coating film 30M thereon; a laminating portion 130 that adheres the second barrier film 20 (hereinafter, also referred to as "second film 20") to the coating film 30M such that the coating film 30M is interposed between the first barrier film 10 and the second barrier film 20; a curing portion 160 that cures the coating film 30M; and a winder (not shown).

The steps of manufacturing the wavelength conversion member using the manufacturing device shown in FIGS. 2 and 3 include at least: a step of forming a coating film by applying the polymerizable composition to a surface of the first barrier film 10 which is continuously transported; a step of interposing the coating film between the first film 10 and the second film 20 by laminating the second barrier film 20, which is continuously transported, on the coating film; and a step of forming the wavelength conversion layer (cured layer) by winding any one of the first film 10 and the second film 20 around a backup roller in a state where the coating film is interposed between the first film 10 and the second film 20, and irradiating the coating film with light to be cured and polymerized while being continuously transported. In the embodiment, as the first film 10 and the second film 20, barrier films having barrier properties against oxygen and water are used. With the above-described configuration; the wavelength conversion member 1D in which opposite surfaces of the wavelength conversion layer are protected by the barrier films can be obtained. A single layer of the wavelength conversion member may be protected by the barrier film. In this case, it is preferable that the barrier film side is a side close to the external air.

More specifically, first, the first film 10 is continuously transported from a transporter (not shown) to a coating portion 120. The first film 10 is transported from the transporter at a transport speed of, for example, 1 to 50 m/min. In this case, the transport speed is not limited to the above value. During the transportation, for example, a tension of 20 to 150 N/m and preferably 30 to 100 N/m is applied to the first film 10.

In the coating portion 120, the polymerizable composition (hereinafter, also referred to as "coating solution") is applied to a surface of the first film 10, which is continuously transported, to form a coating film 30M (refer to FIG. 3) thereon. In the coating portion 120, for example, a die coater 124 and a backup roller 126 which is disposed to face the die coater 124 are provided. A surface of the first film 10 opposite to the surface on which the coating film 30M is formed is wound around the backup roller 126, and the coating solution is applied from a jetting port of the die coater 124 to the surface of the first substrate 10 which is continuously transported, to form the coating film 30M thereon. Here, the coating film 30M refers to the polymerizable composition which is applied to the first film 10 and is not cured.

In the embodiment, the die coater 124 to which an extrusion coating method is applied is used as a coating device in the coating portion 120, but the present invention is not limited thereto. For example, coating devices to which various methods such as a curtain coating method, a rod coating method, or a roll coating method are applied can be used.

The first film 10 which has passed through the coating portion 120 and on which the coating film 30M is formed is continuously transported to a laminating portion 130. In the laminating portion 130, the second film 20 which is continuously transported is laminated on the coating film 30M such that the coating film 30M is interposed between the first film 10 and the second film 20.

In the laminating portion 130, a laminating roller 132 and a heating chamber 134 which surrounds the laminating roller 132 are provided. In the heating chamber 134, an opening 136 through which the first film 10 passes and an opening 138 through which the second film 20 passes are provided.

At a position opposite to the laminating roller 132, a backup roller 162 is disposed. The first film 10 on which the coating film 30M is formed is continuously transported to a laminating position P in a state where a surface opposite to the surface on which the coating film 30M is formed is wound around the backup roller 162. The laminating position P refers to a position where contact between the second film 20 and the coating film 30$m$ starts. It is preferable that the first film 10 is wound around the backup roller 162 before reaching the laminating position P. The reason for this is that, even in a case where wrinkles are formed on the first film 10, the wrinkles are corrected and removed by the backup roller 162 before reaching the laminating position P. Therefore, it is preferable that a distance L1 from a position (contact position) where the first film 10 is wound around the backup roller 162 to the laminating position P is long. For example, the distance L1 is preferably 30 mm or longer, and the upper limit value thereof is typically determined based on a diameter and a pass line of the backup roller 162.

In the embodiment, the second film 20 is laminated by the backup roller 162 which is used in a curing portion 160 and the laminating roller 132. That is, the backup roller 162 which is used in the curing portion 160 also functions as a roller used in the laminating portion 130. However, the present invention is not limited to this configuration. A laminating roller other than the backup roller 162 may be provided in the laminating portion 130 such that the backup roller 162 does not function as a roller used in the laminating portion 130.

By using the backup roller 162, which is used in the curing portion 160, in the laminating portion 130, the number of rollers can be reduced. In addition, the backup roller 162 can also be used as a heat roller for heating the first film 10.

The second film 20 transported from a transporter (not shown) is wound around the laminating roller 132 and is continuously transported between the laminating roller 132 and the backup roller 162. At the laminating position P, the second film 20 is laminated on the coating film 30M formed on the first film 10. As a result, the coating film 30M is interposed between the first film 10 and the second film 20. Laminating described herein represents that the second film 20 is laminated on the coating film 30M.

It is preferable that a distance L2 between the laminating roller 132 and the backup roller 162 is more than the total thickness of the first film 10, the wavelength conversion layer (cured layer) 30 obtained by curing and polymerizing the coating film 30M, and the second film 20. In addition, it is preferable that L2 is equal to or less than a length obtained by adding 5 mm to the total thickness of the first film 10, the coating film 30M, and the second film 20. By adjusting the distance L2 to be equal to or less than the length obtained by adding 5 mm to the total thickness, permeation of bubbles into a gap between the second film 20 and the coating film 30M can be prevented. Here, the distance L2 between the laminating roller 132 and the backup roller 162 refers to the shortest distance between the outer circumferential surface of the laminating roller 132 and the outer circumferential surface of the backup roller 162.

Regarding the rotational accuracy of the laminating roller 132 and the backup roller 162, the radial run-out is 0.05 or less and preferably 0.01 or less. As the radial run-out decreases, the thickness distribution of the coating film 30M can be reduced.

In addition, in order to suppress thermal deformation after the coating film 30M is interposed between the first film 10 and the second film 20, a difference between the temperature of the backup roller 162 and the temperature of the first film 10 in the curing portion 160 and a difference between the temperature of the backup roller 162 and the temperature of the second film 20 are preferably 30° C. or lower, more preferably 13° C. or lower, and still more preferably 0° C.

In a case where the heating chamber 134 is provided in order to reduce the differences from the temperature of the backup roller 162, it is preferable that the first film 10 and the second film 20 are heated in the heating chamber 134. For example, hot air is supplied from a hot air blower (not shown) into the heating chamber 134 such that the first film 10 and the second film 20 can be heated.

The first film 10 may be wound around the backup roller 162 whose temperature is controlled such that the first film 10 is heated by the backup roller 162.

On the other hand, regarding the second film 20, by using a heat roller as the laminating roller 132, the second film 20 can be heated by the laminating roller 132. In this case, the heating chamber 134 and the heat roller are not essential and can be optionally provided.

Next, the coating film 30M is continuously transported to the curing portion 160 while being interposed between the first film 10 and the second film 20. In the configuration shown in the drawing, curing in the curing portion 160 is performed by light irradiation. However, in a case where the polymerizable compound included in the polymerizable composition is polymerizable by heating, curing can be performed by heating such as blowing warm air.

At a position opposite to the backup roller 162, a light irradiating device 164 is provided. The first film 10 and the second film 20 between which the coating film 30M is interposed are continuously transported between the backup roller 162 and the light irradiating device 164. Light irradiated by the light irradiating device may be determined depending on the kind of the photopolymerizable compound in the polymerizable composition. For example, ultraviolet light can be used. Here, the ultraviolet light refers to light in a wavelength range of 280 to 400 nm. As a light source which emits ultraviolet light, for example, a low-pressure mercury lamp, a middle-pressure mercury lamp, a high-pressure mercury lamp, an ultrahigh-pressure mercury lamp, a carbon arc lamp, a metal halide lamp, or a xenon lamp can be used. The irradiation dose may be determined in a range where the polymerization and curing reaction can be performed. For example, the coating film 30M is irradiated with ultraviolet light in an irradiation dose of 100 to 10000 mJ/cm$^2$.

In the curing portion 160, the first film 10 is wound around the backup roller 162 in a state where the coating film 30M is interposed between the first film 10 and the second film 20, and the coating film 30M is irradiated with light by the light irradiating device 164 while being continuously transported. As a result, the coating film 30M is cured to form the wavelength conversion layer 30.

In the embodiment, the first film 10 side is wound around the backup roller 162 and is continuously transported. However, the second film 20 may be wound around the backup roller 162 and may be continuously transported.

"Being around the backup roller 162" represents a state where any one of the first film 10 and the second film 20 is in contact with a surface of the backup roller 162 at a given lap angle. Accordingly, the first film 10 and the second film 20 move in synchronization with the rotation of the backup roller 162 while being continuously transported. Any one of the first film 10 and the second film 20 only has to be wound around the backup roller 162 while at least being irradiated with ultraviolet light.

The backup roller 162 includes a main body having a cylindrical shape and a rotating shaft that is disposed at opposite end portions of the main body. The main body of the backup roller 162 has a diameter φ of, for example, 200 to 1000 mm. The diameter φ of the backup roller 162 is not particularly limited. The diameter φ is preferably 300 to 500 mm from the viewpoints of curling deformation of the laminated film, facility costs, and rotational accuracy. By mounting a temperature controller on the main body of the backup roller 162, the temperature of the backup roller 162 can be controlled.

The temperature of the backup roller 162 can be determined in consideration of heat generation during the light irradiation, the curing efficiency of the coating film 30M, and the wrinkling of the first film 10 and the second film 20 on the backup roller 162. The temperature of the backup roller 162 is set to be in a temperature range of preferably 10° C. to 95° C. and more preferably 15° C. to 85° C. Here, the temperature regarding a roller refers to the surface temperature of the roller.

A distance L3 between the laminating position P and the light irradiating device 164 can be made to be, for example, 30 mm or more.

The coating film 30M is irradiated with light to form the wavelength conversion layer 30, and the wavelength conversion member 1D including the first film 10, the wavelength conversion layer 30, and the second film 20 is manufactured. The wavelength conversion member 1D is peeled off from the backup roller 162 by a peeling roller 180. The wavelength conversion member 1D is continuously transported to a winder (not shown) and then is wound in a roll shape by the winder.

[Backlight Unit]

Figure 4:
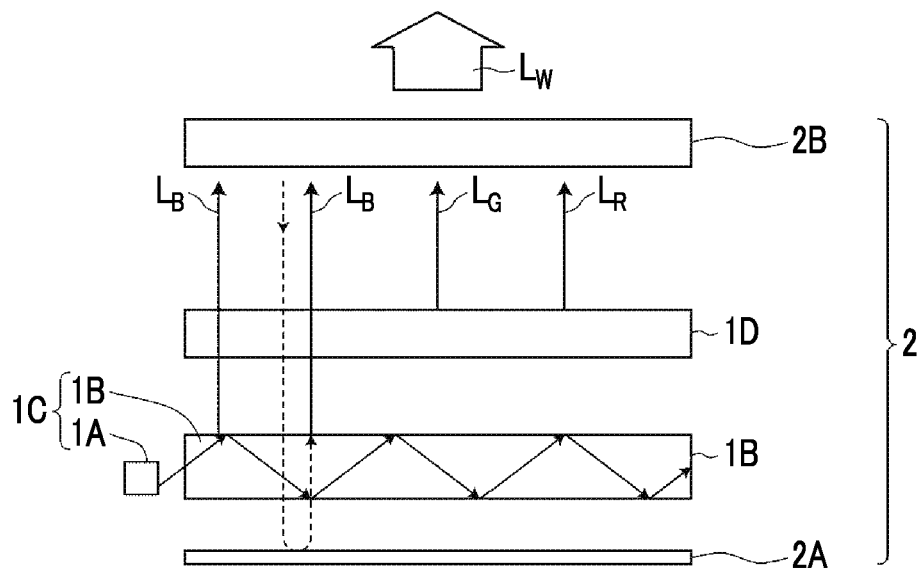
FIG. 4 is a cross-sectional view showing a schematic configuration of a backlight unit including a wavelength conversion member according to an embodiment of the present invention.

Hereinafter, a backlight unit including the wavelength conversion member according to the present invention will be described. FIG. 4 is a cross-sectional view showing a schematic configuration of the backlight unit.

As shown in FIG. 4, a backlight unit 2 according to the present invention includes: a surface light source 1C including a light source 1A, which emits primary light (blue light $L_B$), and a light guide plate 1B which guides and emits the primary light emitted from the light source 1A; a wavelength conversion member 1D that is provided on the surface light source 1C; a retroreflecting member 2B that is disposed to face the surface light source 1C with the wavelength conversion member 1D interposed therebetween; and a reflection plate 2A that is disposed to face the wavelength conversion member 1D with the surface light source 1C interposed therebetween. The wavelength conversion member 1D is excited by excitation light, which is at least a portion of the primary light $L_B$ emitted from the surface light source 1C, to emit fluorescence and emits secondary light (green light $L_G$, red light $L_R$) which includes the fluorescence and the primary light $L_B$ which has passed through the wavelength conversion member 1D. Using $L_G$, $L_R$, and $L_B$, the white light $L_W$ is emitted from a surface of the retroreflecting member 2B.

The shape of the wavelength conversion member 1D is not particularly limited and may be an arbitrary shape such as a sheet shape or a bar shape.

In FIG. 4, $L_B$, $L_G$, and $L_R$ emitted from the wavelength conversion member 1D are incident on the retroreflecting member 2B, and each incident light is repeatedly reflected between the retroreflecting member 2B and the reflection plate 2A and passes through the wavelength conversion member 1D multiple times. As a result, in the wavelength conversion member 1D, a sufficient amount of the excitation light (blue light $L_B$) is absorbed by the quantum dots 30A emitting the red light $L_R$ and the quantum dots 30B emitting the green light $L_G$, a sufficient amount of fluorescence (green light $L_G$, red light $L_R$) is emitted, and white light $L_W$ is realized and emitted from the retroreflecting member 2B.

In a case where ultraviolet light is used as the excitation light, by causing ultraviolet light as excitation light to be incident on the wavelength conversion layer 30 including the quantum dots 30A and 30B shown in FIG. 1 and the quantum dots 30C (not shown), white light can be realized by red light emitted from the quantum dots 30A, green light emitted from the quantum dots 30B, and blue light emitted from the quantum dots 30C.

From the viewpoint of realizing high brightness and high color reproducibility, it is preferable that the backlight unit includes a multi-wavelength light source. For example, it is preferable that blue light having a center emission wavelength in a wavelength range of 430 to 480 nm and having a full width at half maximum of emission peak of 100 nm or less, green light having a center emission wavelength in a wavelength range of 520 to 560 nm and having a full width at half maximum of emission peak of 100 nm or less, and red light having a center emission wavelength in a wavelength range of 600 to 680 nm and having a full width at half maximum of emission intensity peak of 100 nm or less are emitted.

From the viewpoint of further improving brightness and color reproducibility, the wavelength range of the blue light emitted from the backlight unit is more preferably 440 to 460 nm.

From the same viewpoint, the wavelength range of the green light emitted from the backlight unit is more preferably 520 to 545 nm.

In addition, from the same viewpoint, the wavelength range of the red light emitted from the backlight unit is more preferably 610 to 640 nm.

In addition, from the same point, the full width at half maximum of the emission intensity of each of the blue light, the green light, and the red light emitted from the backlight unit is preferably 80 nm or less, more preferably 50 nm or less, still more preferably 40 nm or less, and still more preferably 30 nm or less. In particular, it is more preferable that the full width at half maximum of the emission intensity of the blue light is 25 nm or less.

As the light source 1A, for example, a light source which emits blue light having a center emission wavelength in a wavelength range of 430 nm to 480 nm, or a light source which emits ultraviolet light can be used. As the light source 1A, for example, a light emitting diode or a laser light source can be used.

As shown in FIG. 4, the surface light source 1C may include: the light source 1A; and the light guide plate 1B that guides and emits the primary light emitted from the light source 1A. Alternatively, the surface light source 1C may include: the light source 1A that is disposed along with a plane parallel to the wavelength conversion member 1D; and a diffusion plate that is provided instead of the light guide plate 1B. The former light source is called an edge light mode, and the latter light source is called a direct backlight mode.

In the above description regarding FIG. 4, the configuration of the backlight unit is an edge light mode including a light guide plate or a reflection plate as a component. However, the configuration of the backlight unit may be a direct backlight mode. As the light guide plate, a well-known light guide plate can be used without any particular limitation.

In the embodiment, the example in which the surface light source is used as the light source has been described. As the light source, a light surface other than the surface light source can also be used.

In a case where a light source emitting blue light is used, the wavelength conversion layer includes at least: the quantum dots 30A that are excited by excitation light to emit red light; and the quantum dots 30B that are excited by excitation light to emit green light. As a result, white light can be realized by blue light, which has been emitted from the light source and has passed through the wavelength conversion member, and red light and green light which have been emitted from the wavelength conversion member.

In addition, in another configuration, a light source (ultraviolet light source) which emits ultraviolet light having a center emission wavelength in a wavelength range of 300 nm to 430 nm, for example, an ultraviolet light emitting diode can be used as the light source. In this case, the wavelength conversion layer includes not only the quantum dots 30A and 30B but also the quantum dots 30C that are excited by excitation light to emit blue light. As a result, white light can be realized by red light, green light, and blue light emitted from the wavelength conversion member.

In addition, in another configuration, a laser light source can also be used instead of a light emitting diode.

In addition, as the reflection plate 2A, a well-known reflection plate can be used without any particular limitation. The details of the reflection plate 2A can be found in JP3416302B, JP3363565B, JP4091978B, and JP3448626B, the contents of which are incorporated herein by reference.

The retroreflecting member 2B may be formed of a well-known diffusion plate, a diffusion sheet, a prism sheet (for example, BEF series, manufactured by Sumitomo 3M Ltd.), or a reflective polarizing film (for example, DBEF series, manufactured by Sumitomo 3M Ltd.). The configuration of the retroreflecting member 2B can be found in JP3416302B, JP3363565B, JP4091978B, and JP3448626B, the contents of which are incorporated herein by reference.

[Liquid Crystal Display Device]

Figure 5:
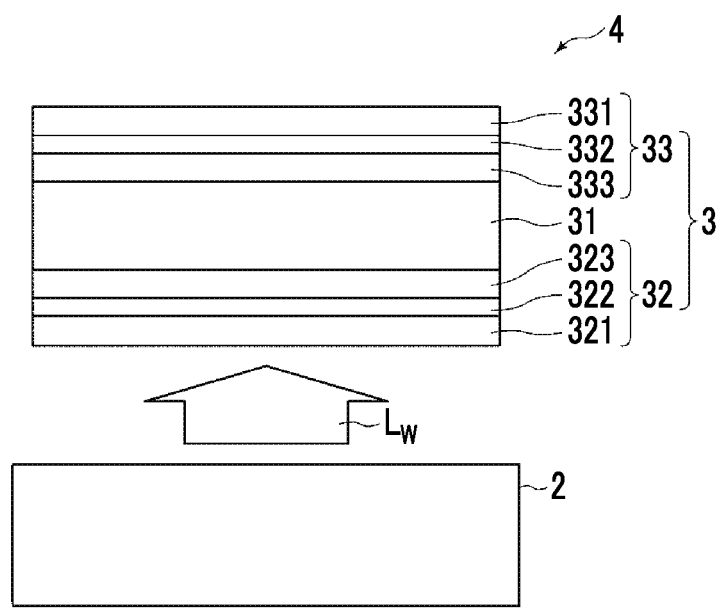
FIG. 5 is a cross-sectional view showing a schematic configuration of a liquid crystal display device including a backlight unit according to an embodiment of the present invention.

The above-described backlight unit 2 can be applied to a liquid crystal display device. FIG. 5 is a cross-sectional view showing a schematic configuration of the liquid crystal display device according to the present invention.

As shown in FIG. 5, a liquid crystal display device 4 includes: the backlight unit 2 according to the embodiment; and a liquid crystal cell unit 3 that is disposed to face the retroreflecting member 2B side of the backlight unit 2. In the liquid crystal cell unit 3, a liquid crystal cell 31 is interposed between polarizing plates 32 and 33. In the polarizing plates 32 and 33, opposite main surfaces of polarizers 322 and 332 are protected by polarizing plate protective films 321 and 323 and polarizing plate protective films 331 and 333, respectively.

Regarding each of the liquid crystal cell 31, the polarizing plates 32 and 33, and other components which constitute the liquid crystal display device 4, a product prepared using a well-known method or a commercially available product can be used without any particular limitation. In addition, of course, a well-known interlayer such as an adhesive layer can be provided between respective layers.

As a driving mode of the liquid crystal cell 31, various modes such as a twisted nematic (TN) mode, a super twisted nematic (STN) mode, a vertical alignment (VA) mode, an in-plane switching (IPS) mode, or an optically compensated bend (OCB) cell mode can be used without any particular limitation. The liquid crystal cell is preferably a VA mode, an OCB mode, an IPS mode, or a TN mode but is not limited thereto. Examples of the configuration of the VA mode liquid crystal display device include a configuration shown in FIG. 2 described in JP2008-262161A. However, a specific configuration of the liquid crystal display device is not particularly limited, and a well-known configuration can be adopted.

Optionally, the liquid crystal display device 4 further includes an optical compensation member for optical compensation or a sub-functional layer such as an adhesive layer. Further, in addition to (or instead of) a color filter substrate, a thin film transistor substrate, a lens film, a diffusion sheet, a hard coat layer, an anti-reflection layer, a low-reflection layer, or an anti-glare layer, a surface layer such as a forward scattering layer, a primer layer, an antistatic layer, or an undercoat layer may be disposed.

The backlight-side polarizing plate 32 may include a phase difference film as the polarizing plate protective film 323 on the liquid crystal cell 31 side. As this phase difference film, for example, a well-known cellulose acylate film can be used.

The backlight unit 2 and the liquid crystal display device 4 includes the wavelength conversion layer according to the present invention having a high polymerization degree and high curing properties and thus have high brightness.

EXAMPLES

Hereinafter, the present invention will be described in detail using examples. Materials, used amounts, ratios, treatment details, treatment procedures, and the like shown in the following examples can be appropriately changed within a range not departing from the scope of the present invention. Accordingly, the scope of the present invention is not limited to the following specific examples.

(Preparation of Barrier Film 10)

As a support, a polyethylene terephthalate (PET) film (trade name: COSMOSHINE (registered trade name) A4300, manufactured by Toyobo Co., Ltd.) having a thickness of 50 μm was used, and an organic layer and an inorganic layer were formed in this order on a single surface of the support in the following procedure.

Trimethylolpropane triacrylate (TMPTA, manufactured by Daicel-Allnex Ltd.) and a photopolymerization initiator (ESACURE KTO 46, manufactured by Lamberti S.p.A.) were prepared and were weighed such that a mass ratio thereof was 95:5. These components were dissolved in methyl ethyl ketone. As a result, a coating solution having a solid content concentration of 15% was obtained. This coating solution was applied to the above-described PET film using a roll-to-roll method with a die coater and was allowed to pass through a drying zone at 50° C. for 3 minutes. Next, in a nitrogen atmosphere, the coating solution was irradiated with ultraviolet light (cumulative irradiation dose: about 600 mJ/cm$^2$) to be cured, and the PET film was wound. The thickness of an organic layer formed on the support was 1 μm.

Next, using a roll-to-roll chemical vapor deposition (CVD) apparatus, an inorganic layer (silicon nitride layer) was formed on a surface of the organic layer. As raw material gases, silane gas (flow rate: 160 sccm), ammonia gas (flow rate: 370 sccm), hydrogen gas (flow rate: 590 sccm), and nitrogen gas (flow rate: 240 sccm) were used. As a power supply, a high-frequency power supply having a frequency of 13.56 MHz was used. The film forming pressure was 40 Pa, and the achieved thickness was 50 nm.

In this way, the barrier film 10 in which the inorganic layer was formed on a surface of the organic layer formed on the support was prepared.

(Preparation of Surface-Treated Barrier Film)

A silane coupling agent-containing composition having the following composition was prepared and was used as a composition for a surface treatment (coating solution for a surface treatment). This composition for a surface treatment was applied to the inorganic layer of the barrier film 10 using a roll-to-roll method with a die coater in an application amount of 2 ml/m$^2$ and was allowed to pass through a drying zone at 120° C. for 3 minutes. In this way, a surface-treated barrier film in which the inorganic layer surface was treated with the silane coupling agent was prepared.

(Composition for Surface Treatment)

The composition for a surface treatment was prepared at a ratio between the following materials.

Isopropanol/Ethanol/Acetic Acid/Water/KBM-5103 (silane coupling agent-containing solution; manufactured by Shin-Etsu Chemical Co., Ltd.)=14/14/2/20/50 (mass ratio)

(Preparation of Polymerizable Composition 1 Used in Example 1)

Regarding quantum dots used in Example 1, CZ520-100 (manufactured by NN-Labs LLC.) was used as a green quantum dot dispersion G1 having an emission wavelength 535 nm. In addition, CZ620-100 (manufactured by NN-Labs LLC.) was used as a red quantum dot dispersion R1 having a maximum emission wavelength of 630 nm. Here, in these quantum dots, a core was CdSe, a shell was ZnS, and a ligand was octadecylamine. The quantum dots were dispersed in toluene in a concentration of 3 wt %.

20 parts by mass of the quantum dot dispersion G1, 2 parts by mass of the quantum dot dispersion R1, 80 parts by mass of chloroform, and 5 parts by mass of the following compound A11 as a dispersant were mixed and stirred using a VORTEX mixer for 1 hour. Next, the mixture was mixed with 90 parts by mass of CELLOXIDE 2021P (manufactured by Daicel Corporation) as a polymerizable compound, was stirred using a VORTEX mixer for 1 hour, and was left to stand for 24 hours. This series of operations was performed in a dry nitrogen atmosphere.

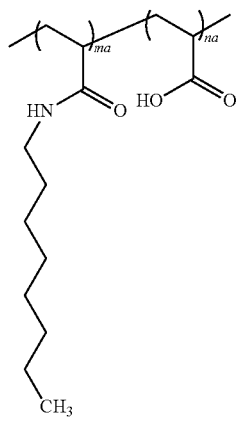

Compound A11

A ratio of ma to na was 8:2.

The dispersion obtained as described above was filtered through a polypropylene filter having a pore size of 0.2 μm. Next, the pressure was reduced using an evaporator while heating the filtrate at 50° C., and toluene and chloroform were removed. Next, 3 parts by mass of a photopolymerization initiator IRGACURE 290 (manufactured by BASF SE) was added. In this way, a polymerizable composition 1 used in Example 1 was obtained. The amount of the obtained polymerizable composition 1 corresponded to 100 parts by mass. 100 parts by mass of the polymerizable composition is shown as the coating solution after the preparation in Table 1 and hereinafter will be referred to as the coating solution 1.

Polymerizable Composition 1 (Used in Example 1)

Quantum dot dispersion G1 (maximum emission wavelength: 535 nm): 20 parts by mass Quantum dot dispersion R1 (maximum emission wavelength: 630 nm): 2 parts by mass Chloroform: 80 parts by mass Dispersant (compound A11): 5 parts by mass Polymerizable compound: CEL 2021P (manufactured by Daicel Corporation): 90 parts by mass Photopolymerization initiator IRGACURE (registered trade name) 290 (manufactured by BASF SE): 3 parts by mass (Preparation of Quantum Dot Dispersions Used in Examples 9 and 10 and Comparative Example 3)

Regarding quantum dots used in Example 9, INP530-25 (manufactured by NN-Labs LLC.) was used as a green quantum dot dispersion G2 having an emission wavelength 530 nm. In addition, INP620-25 (manufactured by NN-Labs LLC.) was used as a red quantum dot dispersion R2 having a maximum emission wavelength of 620 nm. Here, in these quantum dots, a core was INP, a shell was ZnS, and a ligand was oleylamine. The quantum dots were dispersed in toluene in a concentration of 3 wt %.

Regarding quantum dots used in Example 10. CZW-G-5 (manufactured by NN-Labs LLC.) was used as a green quantum dot dispersion G3 having an emission wavelength 530 nm. In addition, CIT-R-5 (manufactured by NN-Labs LLC.) was used as a red quantum dot dispersion R3 having a maximum emission wavelength of 620 nm. Here, in these quantum dots, a core was CdSe, a shell was ZnS, and a ligand was mercaptoundecanoic acid. The quantum dots were dispersed in water in a concentration of 3 wt %.

Regarding quantum dots used in Comparative Example 3, 4 parts by mass of n-butylamine was mixed with 20 parts by mass of the quantum dot dispersion G1, and this mixture was left to stand for 24 hours to prepare a quantum dot dispersion G4. In addition, 0.8 parts by mass of n-butylamine was mixed with 4 parts by mass of the quantum dot dispersion R1, and this mixture was left to stand for 24 hours to prepare a quantum dot dispersion R4. In the quantum dot dispersions G4 and R4, the ligand was exchanged with n-butylamine.

(Preparation of Polymerizable Compositions and Coating Solutions Used in Other Examples and Comparative Examples)

Polymerizable compositions and coating solutions were prepared using the same method as in Example 1, except that materials and the mass ratio between the materials were as shown in Table 1.

The LogP values shown in Table 1 were calculated using ChemBioDraw Ultra 12.0 (manufactured by PerkinElmer Inc.) based on a structure of a compound.

(Preparation of Wavelength Conversion Member According to Example 1)

A wavelength conversion member was obtained through the manufacturing steps described with reference to FIGS. 2 and 3 in which the barrier film 10 prepared as described above was used as the first film and second film. Specifically, the barrier film 10 was prepared as the first film, and the coating solution 1 prepared as described above was applied to the surface of the inorganic layer using a die coater while continuously transporting the first film at 1 m/min with a tension of 60 N/m. As a result, a coating film having a thickness of 50 μm was formed. Next, the first film (barrier film 10) on which the coating film was formed was wound around the backup roller, and the second film (barrier film 10) was laminated on the coating film such that the inorganic layer surface was in contact with the coating film. The laminate was irradiated with ultraviolet light to be cured using an air-cooled metal halide lamp (manufactured by Eye Graphics Co., Ltd.) of 160 W/cm while being continuously transported in a state where the coating film was interposed between the two barrier films 10. As a result, a wavelength conversion layer including the quantum dots was formed. The irradiation dose of ultraviolet light was 2000 mJ/cm$^2$.

(Preparation of Wavelength Conversion Members According to Other Examples and Comparative Examples)

Wavelength conversion members were prepared using the same method as in Example 1, except that: the polymerizable compositions (coating solutions) used in other Examples and Comparative Examples which were prepared as described above were used; and the barrier film 10 or the surface-treated barrier film was used as the substrate film.

(Evaluation of Brightness)

A commercially available tablet terminal (trade name: "Kindle (registered trade name) Fire HDX 7", manufactured by Amazon.com Inc.; hereinafter, also simply referred to as "Kindle Fire HDX 7") was disassembled to extract QDEF (quantum dot film, manufactured by 3M) from a backlight unit, and the wavelength conversion member according to each of the Examples and Comparative Examples which was cut into a rectangular shape was incorporated instead of QDEF. In this way, a liquid crystal display device was prepared.

The prepared liquid crystal display device was turned on such that the entire surface was white, and the brightness thereof was measured using a brightness meter (trade name: "SR3", manufactured by Topcon Corporation) provided at a distance of 740 mm perpendicular to the surface of the light guide plate. The measurement results are shown in Table 1.

(Evaluation of Decrease in Brightness in Outer Peripheral Region)

The respective wavelength conversion members according to the Examples and Comparative Examples were punched using a punching machine with a 4 cm×4 cm Thomson blade, were placed on a commercially available blue light source (trade name: "OPSM-H150X142B", manufactured by OPTEX FA Co., Ltd.) in a room held at 25° C. and a relative humidity of 60%, and were continuously irradiated with blue light for 1000 hours.

Next, Kindle Fire HDX 7 was disassembled to extract a backlight unit, each of the wavelength conversion members irradiated with the blue light was placed on a light guide plate, and two prism sheets extracted from Kindle Fire HDX 7 were laminated on the wavelength conversion member such that directions of surface unevenness patterns thereof were perpendicular to each other. The backlight unit was turned on, and the brightness was measured using an imaging colorimeter&photometer (trade name: "ProMetric", manufactured by Radiant Vision Systems LLC.) provided at a distance of 740 mm from a surface of the backlight unit.

Based on the measurement result, in an outer peripheral region (a region ranging from four corners of the screen to inner positions at a distance of 1 cm from the four corners), the proportion of areas where the brightness was decreased by 15% or higher compared to the brightness measured at the center of the screen was obtained and was evaluated based on the following evaluation criteria. The results are shown in Table 1 below.

(Evaluation Criteria)

A: The proportion of areas where the brightness was decreased by 15% or higher in the outer peripheral region was lower than 25%

B: The proportion of areas where the brightness was decreased by 15% or higher in the outer peripheral region was 25% or higher and lower than 50%

C: The proportion of areas where the brightness was decreased by 15% or higher in the outer peripheral region was 50% or higher and lower than 75%

D: The proportion of areas where the brightness was decreased by 15% or higher in the outer peripheral region was 75% or higher

TABLE 1

| | Substrate Film | Thickness of Wavelength Conversion Layer (μm) | Quantum Dot Dispersion 1 Kind | Quantum Dot Dispersion 1 Amount (Parts by Mass) | Quantum Dot Dispersion 2 Kind | Quantum Dot Dispersion 2 Amount (Parts by Mass) | Solvent Kind | Solvent Amount (Parts by Mass) | Dispersant Material | Dispersant Amount (Parts by Mass) |
|---|---|---|---|---|---|---|---|---|---|---|
| Example 1 | Barrier Film 10 | 50 | Dispersion G1 | 20 | Dispersion R1 | 2 | Chloroform | 80 | Compound A11 | 5 |
| Example 2 | Barrier Film 10 | 50 | Dispersion G1 | 20 | Dispersion R1 | 2 | Chloroform | 80 | Compound A21 | 5 |
| Example 3 | Barrier Film 10 | 50 | Dispersion G1 | 20 | Dispersion R1 | 2 | Chloroform | 80 | Compound A31 | 5 |
| Example 4 | Barrier Film 10 | 50 | Dispersion G1 | 20 | Dispersion R1 | 2 | Chloroform | 80 | Compound A41 | 5 |
| Example 5 | Barrier Film 10 | 50 | Dispersion G1 | 20 | Dispersion R1 | 2 | Chloroform | 80 | Compound B11 | 5 |
| Example 6 | Barrier Film 10 | 50 | Dispersion G1 | 20 | Dispersion R1 | 2 | Chloroform | 80 | Compound C | 5 |
| Example 7 | Barrier Film 10 | 50 | Dispersion G1 | 20 | Dispersion R1 | 2 | Chloroform | 80 | Compound D1 | 5 |
| Example 8 | Barrier Film 10 | 50 | Dispersion G1 | 20 | Dispersion R1 | 2 | Chloroform | 80 | Compound E1 | 5 |
| Example 9 | Barrier Film 10 | 50 | Dispersion G2 | 20 | Dispersion R2 | 2 | Chloroform | 80 | Compound E1 | 5 |
| Example 10 | Barrier Film 10 | 50 | Dispersion G3 | 20 | Dispersion R3 | 2 | Ethanol | 80 | Compound A11 | 5 |
| Example 11 | Surface-Treated Barrier Film | 50 | Dispersion G1 | 20 | Dispersion R1 | 2 | Chloroform | 80 | Compound A11 | 5 |
| Comparative Example 1 | Barrier Film 10 | 50 | Dispersion G1 | 20 | Dispersion R1 | 2 | — | — | — | — |
| Comparative Example 2 | Surface-Treated Barrier Film | 50 | Dispersion G1 | 20 | Dispersion R1 | 2 | — | — | — | — |
| Comparative Example 3 | Barrier Film 10 | 50 | Dispersion G4 | 20 | Dispersion R4 | 2 | Chloroform | 80 | Compound A11 | 5 |
| Comparative Example 4 | Barrier Film 10 | 50 | Dispersion G1 | 20 | Dispersion R1 | 2 | Chloroform | 80 | Compound A51 | 5 |

| | Polymerizable Compound Material | Polymerizable Compound LogP | Polymerizable Compound Amount (Parts by Mass) | Polymerization Initiator Material | Polymerization Initiator Amount (Parts by Mass) | Weight of Coating Solution after Adjustment Amount (Parts by Mass) | Brightness (cd/m²) | Decrease in Brightness in Outer Peripheral Region |
|---|---|---|---|---|---|---|---|---|
| Example 1 | CEL2021P | 0.8 | 90 | Irg290 | 3 | 100 | 510 | A |
| Example 2 | CEL2021P | 0.8 | 90 | Irg290 | 3 | 100 | 501 | A |
| Example 3 | CEL2021P | 0.8 | 90 | Lrg290 | 3 | 100 | 492 | A |

TABLE 1-continued

| | | | | | | | | |
|---|---|---|---|---|---|---|---|---|
| Example 4 | CEL2021P | 0.8 | 90 | Irg290 | 3 | 100 | 498 | A |
| Example 5 | CEL2021P | 0.8 | 90 | Irg290 | 3 | 100 | 525 | A |
| Example 6 | CEL2021P | 0.8 | 90 | Irg290 | 3 | 100 | 487 | A |
| Example 7 | CEL2021P | 0.8 | 90 | Irg290 | 3 | 100 | 512 | A |
| Example 8 | CEL2021P | 0.8 | 90 | Irg290 | 3 | 100 | 527 | A |
| Example 9 | CEL2021P | 0.8 | 90 | Irg290 | 3 | 100 | 423 | B |
| Example 10 | CEL2021P | 0.8 | 90 | Irg290 | 3 | 100 | 367 | B |
| Example 11 | PEA | 2.3 | 92 | Irg819 | 1 | 100 | 515 | B |
| Comparative Example 1 | CEL2021P | 0.8 | 95 | Irg290 | 3 | 100 | 297 | A |
| Comparative Example 2 | LMA | 5.6 | 97 | Irg819 | 1 | 100 | 525 | D |
| Comparative Example 3 | CEL2021P | 0.8 | 90 | Irg290 | 3 | 100 | 284 | B |
| Comparative Example 4 | CEL2021P | 0.8 | 90 | Irg290 | 3 | 100 | 304 | B |

Abbreviations and trade names shown in Table 1 will be described.

CEL2021P: alicyclic epoxy monomer, manufactured by Daicel Corporation

PEA: 2-phenoxyethyl acrylate AMP-10G manufactured by Shin-Nakamura Chemical Co., Ltd.

LMA: lauryl methacrylate

Irg290: IRGACURE 290

Irg819: IRGACURE 819

A compound D1 represents a case where n:m in the compound D was 1:15. A compound E1 represents a case where ne in the compound D was 10.

Structural formulae of compounds A21, A31, A41, A51, and B11 will be shown below. In the compound A21, ma:na:pa was 7:2:1. In the compound A31, mama was 7:3. In the compound A41, ma:na was 7:3. In the compound A51, ma:na was 8:2. In the compound B11, mb:nb was 1:9.

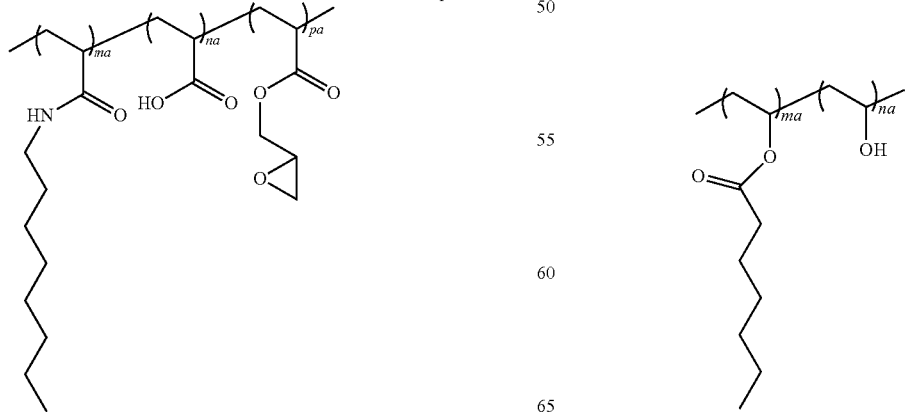

Compound A21

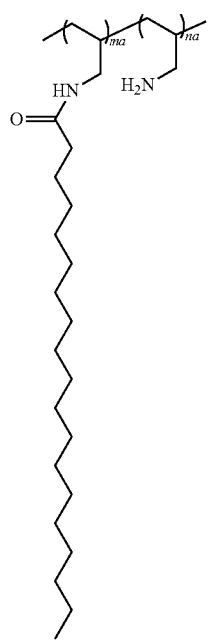

Compound A31

Compound A41

-continued

Compound B11

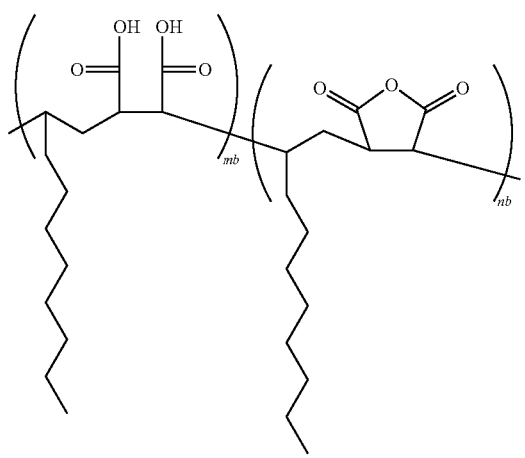

Compound A51

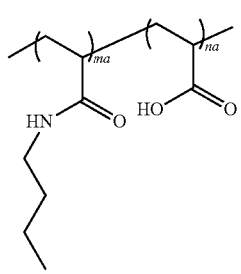

As shown in Table 1, in Examples 1 to 11 in which the polymerizable composition according to the present invention was used, the original brightness was high, and the decrease in brightness in the outer peripheral region was evaluated as B or higher.

On the other hand, the results of Comparative Examples 1, 3, and 4 are presumed as follows. The decrease in brightness in the outer peripheral region was evaluated as B or higher, but the dispersant according to the present invention was not used. Therefore, the quantum dots aggregated, and the brightness was decreased. In addition, the results of Comparative Example 2 are presumed as follows. LMA in which the quantum dots were not likely to aggregate was used, and thus the brightness was high. However, the brightness in the outer peripheral region was decreased due to permeation of oxygen through an end portion.

EXPLANATION OF REFERENCES

1A: light source
1B: light guide plate
1C: surface light source
1D: wavelength conversion member
2: backlight unit
2A: reflection plate
2B: retroreflecting member
3: liquid crystal cell unit
4: liquid crystal display device
10, 20: barrier film
11, 21: support
12, 22: barrier layer
12a, 22a: organic layer
12b, 22b: inorganic layer
13: unevenness imparting layer
30: wavelength conversion layer
30A, 30B: quantum dots
30P: organic matrix
31: liquid crystal cell
$L_B$: excitation light (primary light, blue light)
$L_R$: red light (secondary light, fluorescence)
$L_G$: green light (secondary light, fluorescence)
$L_W$: white light

What is claimed is:

1. A polymerizable composition comprising:
quantum dots having surfaces coordinated with a ligand;
a polymerizable compound; and
a dispersant,
wherein the ligand is a molecule that includes a saturated hydrocarbon chain having 6 or more carbon atoms and a coordinating group,
a LogP value of the polymerizable compound is 3.0 or lower,
the dispersant has a nonpolar portion and a polar portion in a molecule, and
the nonpolar portion is at least one selected from the group consisting of a saturated hydrocarbon chain having 6 or more carbon atoms, an aromatic ring, and a saturated aliphatic ring having 6 or more carbon atoms, and
the dispersant is at least one selected from the group consisting of Compound A1, Compound A2, Compound A3, Compound A4, Compound B1, Compound C, and Compound D:

Compound A1

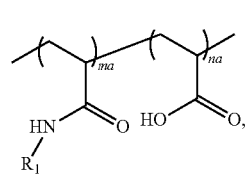

Compound A3

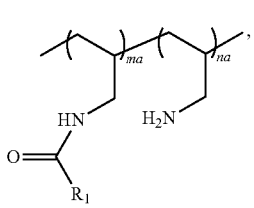

Compound A4

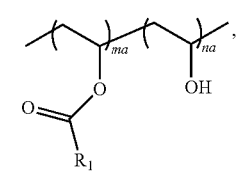

wherein, in Compound A1, A3, and A4 each of ma and na is a number in which ma:na is 5:5 to 9:1, and $R_1$ is at least one of a saturated hydrocarbon chain having 6 or more carbon atoms, an aromatic ring, or a saturated aliphatic ring having 6 or more carbon atoms;

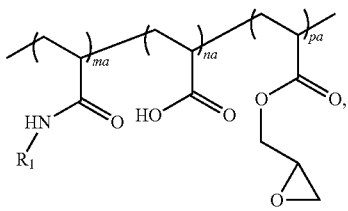

Compound A2 wherein, in Compound A2, each of ma, na and pa is a number in which ma:(na+pa) is 5:5 to 9:1 and na:pa is 1:9 to 9:1, and $R_1$ is at least one of a saturated hydrocarbon chain having 6 or more carbon atoms, an aromatic ring, or a saturated aliphatic ring having 6 or more carbon atoms;

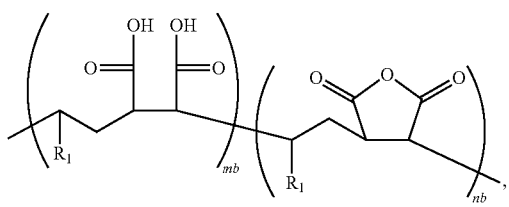

Compound B1 wherein in Compound B1 each $R_1$ is independently selected from a saturated hydrocarbon chain having 6 or more carbon atoms, an aromatic ring, or a saturated aliphatic ring having 6 or more carbon atoms, and mb:nb is 5:5 to 9:1; and

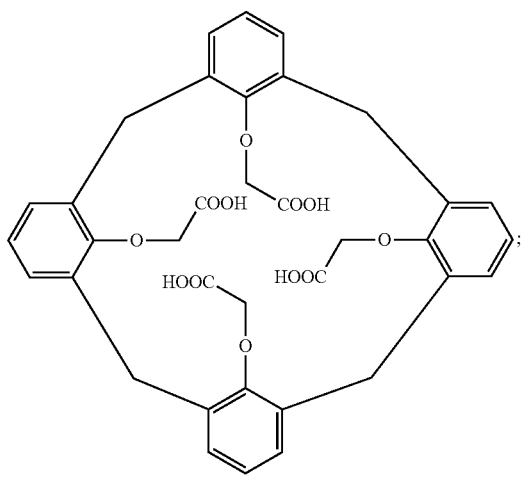

Compound C

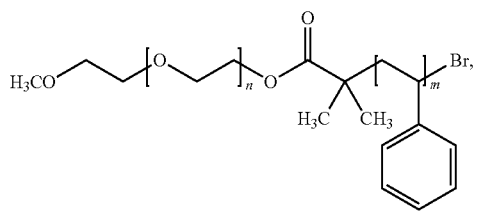

Compound D wherein in Compound D, n:m is 1:5 to 1:20.

2. The polymerizable composition according to claim 1, wherein the quantum dots are at least one kind of quantum dots selected from the group consisting of quantum dots having a center emission wavelength in a wavelength range of 600 nm to 680 nm, quantum dots having a center emission wavelength in a wavelength range of 520 nm to 560 nm, and quantum dots having a center emission wavelength in a wavelength range of 430 nm to 480 nm.

3. The polymerizable composition according to claim 1, wherein the coordinating group is an amino group, a phosphine group, or a phosphine oxide group.

4. The polymerizable composition according to claim 1, wherein the polar portion is at least one selected from the group consisting of an ammonium ion, an acid anhydride, a hydroxyl group, an amino group, a mercapto group, a carboxy group, an aldehyde group, a phosphate group, a sulfo group, a carbonyl group, an ether bond, an ester bond, an amide bond, and an ethylene oxide chain.

5. The polymerizable composition according to claim 1, wherein the polymerizable compound is at least one selected from the group consisting of a compound having an epoxy group and a (meth)acrylate compound.

6. The polymerizable composition according to claim 5, wherein the polymerizable compound is an alicyclic epoxy compound.

7. The polymerizable composition according to claim 5, wherein the polymerizable compound is a monofunctional (meth)acrylate compound.

8. The polymerizable composition according to claim 1, further comprising a photopolymerization initiator.

9. A wavelength conversion member comprising a wavelength conversion layer which is formed by curing the polymerizable composition, the polymerizable composition comprising:
quantum dots having surfaces coordinated with a ligand;
a polymerizable compound; and
a dispersant,
wherein the ligand is a molecule that includes a saturated hydrocarbon chain having 6 or more carbon atoms and a coordinating group,
a LogP value of the polymerizable compound is 3.0 or lower, and
the dispersant has a nonpolar portion and a polar portion in a molecule, and
the nonpolar portion is at least one selected from the group consisting of a saturated hydrocarbon chain having 6 or more carbon atoms, an aromatic ring, and a saturated aliphatic ring having 6 or more carbon atoms, and
the dispersant is at least one selected from the group consisting of Compound A1, Compound A2, Compound A3, Compound A4, Compound B1, Compound C, and Compound D:

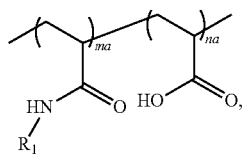

Compound A1

Compound A3

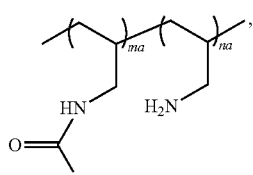

Compound A4

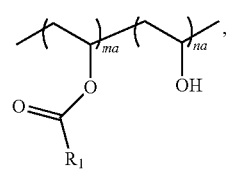

wherein, in Compound A1, A3, and A4 each of ma and na is a number in which ma:na is 5:5 to 9:1, and $R_1$ is at least one of a saturated hydrocarbon chain having 6 or more carbon atoms, an aromatic ring, or a saturated aliphatic ring having 6 or more carbon atoms;

Compound A2

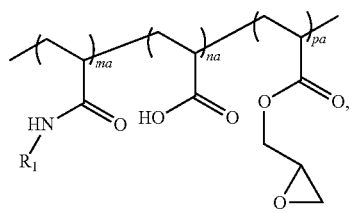

wherein, in Compound A2, each of ma, na and pa is a number in which ma:(na+pa) is 5:5 to 9:1 and na:pa is 1:9 to 9:1, and $R_1$ is at least one of a saturated hydrocarbon chain having 6 or more carbon atoms, an aromatic ring, or a saturated aliphatic ring having 6 or more carbon atoms;

Compound B1

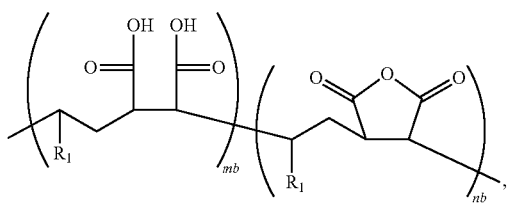

wherein in Compound B1 each $R_1$ is independently selected from a saturated hydrocarbon chain having 6 or more carbon atoms, an aromatic ring having 6 or more carbon atoms, or a saturated aliphatic ring, and mb:nb is 5:5 to 9:1; and Compound C

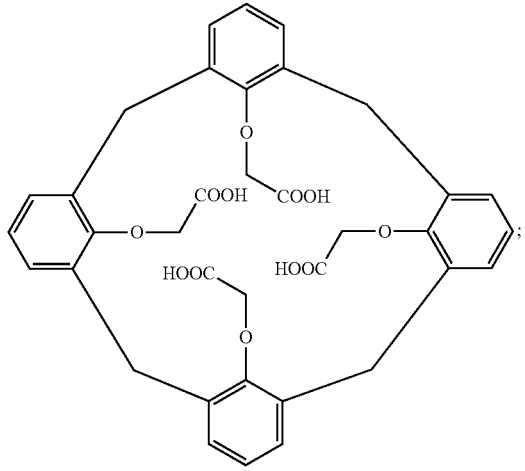

Compound D

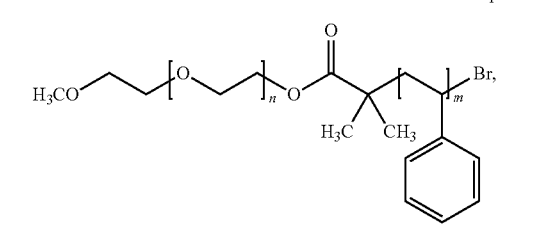

wherein in Compound D, n:m is 1:5 to 1:20.

10. The wavelength conversion member according to claim 9,
   wherein the wavelength conversion layer is formed by curing the polymerizable composition by light irradiation.

11. The wavelength conversion member according to claim 9, further comprising a barrier film having an oxygen permeability of 1.00 cm$^3$/(m$^2$·day·atm) or lower,
   wherein at least one of two main surfaces of the wavelength conversion layer is in contact with the barrier film.

12. The wavelength conversion member according to claim 11,
   wherein two barrier films having an oxygen permeability of 1.00 cm$^3$/(m$^2$·day·atm) or lower are provided, and the two main surfaces of the wavelength conversion layer are in contact with the two barrier films, respectively.

13. A backlight unit comprising at least the wavelength conversion member according to claim 9 and a light source.

14. A liquid crystal display device comprising at least the backlight unit according to claim 13 and a liquid crystal cell.

* * * * *